US010560371B2

(12) United States Patent
Meng

(10) Patent No.: US 10,560,371 B2
(45) Date of Patent: Feb. 11, 2020

(54) METHOD, APPARATUS, TERMINAL DEVICE, AND SYSTEM FOR ADJUSTING WORKING STATUS OF AGGREGATED LINK

(71) Applicant: Huawei Technologies Co., Ltd., Shenzhen (CN)

(72) Inventor: Yu Meng, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 180 days.

(21) Appl. No.: 15/637,116

(22) Filed: Jun. 29, 2017

(65) Prior Publication Data

US 2017/0302568 A1    Oct. 19, 2017

Related U.S. Application Data

(63) Continuation of application No. PCT/CN2014/095310, filed on Dec. 29, 2014.

(51) Int. Cl.
*H04L 12/709* (2013.01)
*H04L 12/54* (2013.01)
(Continued)

(52) U.S. Cl.
CPC ........ *H04L 45/245* (2013.01); *H04L 12/5602* (2013.01); *H04L 47/122* (2013.01); *H04L 47/41* (2013.01)

(58) Field of Classification Search
CPC ..... H04L 12/709; H04L 12/54; H04L 12/803; H04L 12/891; H04L 29/06;
(Continued)

(56) References Cited

U.S. PATENT DOCUMENTS

2010/0190520 A1    7/2010  Reumerman et al.
2014/0185704 A1*   7/2014  Sturkovich .......... H04L 1/0003
                                                    375/296
(Continued)

FOREIGN PATENT DOCUMENTS

CN     1941683 A     4/2007
CN   101110663 A     1/2008
(Continued)

OTHER PUBLICATIONS

Kim, J., et al., "Feedback-Based Traffic Splitting for Wireless Terminals with Multi-Radio Devices," XP011312694, IEEE Transactions on Consumer Electronics, vol. 56, No. 2, May 2010, pp. 476-482.

(Continued)

*Primary Examiner* — Kyaw Z Soe
(74) *Attorney, Agent, or Firm* — Conley Rose, P.C.

(57) ABSTRACT

The present disclosure discloses a method and an apparatus for adjusting a working status of an aggregated link. The method includes: when determining to switch a modulation mode of a first sub-link of an aggregated link from a first modulation mode to a second modulation mode, determining a transmission delay of transmitting a data slice in the second modulation mode by using the first sub-link; comparing the transmission delay of transmitting a data slice in the second modulation mode by using the first sub-link with a transmission delay of transmitting a data slice by using another sub-link of the aggregated link, to obtain a difference; and if the difference meets a preset condition, sending information for controlling a working status of the first sub-link to a transmit end device, so that the transmit end device controls the working status of the first sub-link in the second modulation mode.

20 Claims, 20 Drawing Sheets

(51) Int. Cl.
*H04L 12/803* (2013.01)
*H04L 12/891* (2013.01)

(58) Field of Classification Search
CPC . H04L 12/5602; H04L 45/245; H04L 1/0025; H04L 47/41; H04L 1/0003; H04L 47/122
See application file for complete search history.

(56) References Cited

U.S. PATENT DOCUMENTS

| | | | | |
|---|---|---|---|---|
| 2014/0219284 | A1* | 8/2014 | Chau | H04L 12/2867 370/394 |
| 2014/0313996 | A1* | 10/2014 | Suga | H04W 56/0045 370/329 |

FOREIGN PATENT DOCUMENTS

| | | | | |
|---|---|---|---|---|
| CN | 101755476 A | | 6/2010 | |
| CN | 102640460 A | | 8/2012 | |
| CN | 103888338 A | | 6/2014 | |
| EP | 2797269 A1 | * | 10/2014 | ........ H04W 56/0045 |
| EP | 2797269 A1 | | 10/2014 | |
| WO | 2007149290 A2 | | 12/2007 | |
| WO | 2013162807 A1 | | 10/2013 | |

OTHER PUBLICATIONS

Foreign Communication From a Counterpart Application, European Application No. 14909310.6, Extended European Search Report dated Nov. 13, 2017, 8 pages.
Machine Translation and Abstract of Chinese Publication No. CN102640460, dated Aug. 15, 2012, 19 pages.
Foreign Communication From a Counterpart Application, Chinese Application No. 201480077415.7, Chinese Office Action dated Jan. 23, 2019, 5 pages.
Machine Translation and Abstract of Chinese Publication No. CN1941683, Apr. 4, 2007, 7 pages.
Machine Translation and Abstract of Chinese Publication No. CN101110663, Jan. 23, 2008, 8 pages.
Machine Translation and Abstract of Chinese Publication No. CN103888338, Jun. 25, 2014, 24 pages.
Foreign Communication From a Counterpart Application, PCT Application No. PCT/CN2014/095310, English Translation of International Search Report dated Sep. 24, 2015, 2 pages.
Foreign Communication From a Counterpart Application, PCT Application No. PCT/CN2014/095310, English Translation of Written Opinion dated Sep. 24, 2015, 5 pages.

* cited by examiner

```
CONT.                                    CONT.
FROM                                     FROM
FIG. 10A                                 FIG. 10A
```

S27. When quality of an air interface channel of the first sub-link increases, the receive end device determines to upward adjust the modulation mode of the disabled first sub-link S28. The receive end device sends information indicating that the modulation mode of the first sub-link is switched from the second modulation mode to a third modulation mode to the transmit end device S29. The transmit end device sends, in the second modulation mode by using the first sub-link, a data slice that is converted into microwave data S30. The receive end device receives the microwave data by using the first sub-link, and determines a transmission delay of transmitting a data slice in the third modulation mode by using the first sub-link S31. The receive end device determines that a difference between a transmission delay of the first sub-link in the third modulation mode and a transmission delay of another sub-link is not greater than the threshold S32. The receive end device sends information for enabling the first sub-link to the transmit end device S33. The transmit end device enables the disabled first sub-link in the third modulation mode and distributes a data slice to the first sub-link

FIG. 10B

METHOD, APPARATUS, TERMINAL DEVICE, AND SYSTEM FOR ADJUSTING WORKING STATUS OF AGGREGATED LINK

CROSS-REFERENCE TO RELATED APPLICATIONS

This application is a continuation of International Application No. PCT/CN2014/095310, filed on Dec. 29, 2014, the disclosure of which is hereby incorporated by reference in its entirety.

TECHNICAL FIELD

The present disclosure relates to the field of communications technologies, and more specifically, to a method, an apparatus, a terminal device, and a system for adjusting a working status of an aggregated link.

BACKGROUND

As a data service volume increases, a single physical link cannot well meet a requirement of a telecom application in terms of bandwidth or reliability. A link aggregation technology can well resolve this problem. Link aggregation (LA) is to bundle two or more data links into a virtual aggregated link. An aggregated data link is referred to as a sub-link of the aggregated link. Data is properly allocated to sub-links by means of internal control, so that a bandwidth used to transmit data reaches a sum of bandwidths of all sub-links. In addition, if a sub-link is interrupted, data may be distributed to a remaining sub-link of the aggregated link according to a data distribution policy, so as to improve reliability of a system and achieve redundancy backup for a data link.

Currently, when data is transmitted by using an aggregated link, a transmit end device usually slices data to form data slices, uses a slice as a granularity to evenly distribute the data slices to all sub-links, and numbers each data slice. After receiving the data slices by using all the sub-links, a receive end device recombines the data slices into the data according to serial numbers. This can ensure that a bandwidth of each sub-link is fully used. Because delays for all the sub-links are different, and times in which the data slices sent by the transmit end device reach the receive end device by using different sub-links are also different, when the receive end device recombines the data slices, a previously received data slice cannot be recombined until a data slice whose serial number is less than that of the previously received data slice reaches the receive end device. Therefore, recombination of the data slices is delayed.

An adaptive coding and modulation (ACM) technology is a technology that is used to transmit different types of data in some networks (such as a microwave air interface network). When a network channel changes, for example, there is rain or fog, different coding manners need to be used to adjust a link. Therefore, in the ACM technology, different modulation modes are switched to each other, and this is referred to as ACM switching. For example, the ACM technology may be used in a microwave air interface network, and different modulation modes are used to ensure normal transmission of a voice service and a data service in different conditions of an air interface channel.

The inventor of the present disclosure finds in a research process the following problem: If data is transmitted by using both the LA technology and the ACM technology, when ACM switching is performed on a link, because different modulation modes correspond to different data link bandwidths, switching of a modulation mode is to cause a change of a delay difference between sub-links of an aggregated link. That is, a difference between times of sending, by a transmit end device, data slices to a receive end device by using the sub-links changes. This has a relatively great impact on delay-difference-sensitive data that is transmitted by using the aggregated link. For example, for delay-difference-sensitive services such as a voice service and a video service, if a delay of recombining data slices by a receive end device is extremely large, relatively great jitter exist in the services such as the voice service and the video service. Therefore, normal usage of the services such as the voice service and the video service is affected.

SUMMARY

In view of this, the present disclosure provides a method, an apparatus, a terminal device, and a system for adjusting a working status of an aggregated link, so as to resolve a problem that a delay-difference-sensitive service transmitted by using the aggregated link is greatly affected.

To achieve the foregoing objective, the present disclosure provides the following technical solutions:

According to a first aspect, the present disclosure provides an apparatus for adjusting a working status of an aggregated link, applied to a receive end device, where the apparatus includes: a processor and a transmitter; wherein the processor is configured to: determine to switch a modulation mode of a first sub-link of the aggregated link from a first modulation mode to a second modulation mode; when determining to switch the modulation mode of the first sub-link of the aggregated link from the first modulation mode to the second modulation mode, determine a transmission delay of transmitting a data slice in the second modulation mode by using the first sub-link; compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link; the transmitter is configured to: if the difference meets a preset condition, send information for controlling a working status of the first sub-link to a transmit end device, so that the transmit end device controls the working status of the first sub-link in the second modulation mode.

According to a second aspect, the present disclosure provides an apparatus for adjusting a working status of an aggregated link, applied to a transmit end device, where the apparatus includes: a processor and a receiver; wherein the receiver is configured to: when a receive end device determines to switch a modulation mode of a first sub-link of an aggregated link from a first modulation mode to a second modulation mode, and determines that a difference between a transmission delay of transmitting a data slice in the second modulation mode by using the first sub-link and a transmission delay of transmitting a data slice by using another sub-link of the aggregated link meets a preset condition, receive information that is for controlling a working status of the first sub-link and that is sent by the receive end device, where the another sub-link includes a sub-link that is currently in an enabled state in the aggregated link; and the processor is configured to control the working status of the first sub-link in the second modulation mode.

According to a third aspect, the present disclosure provides a method for adjusting a working status of an aggregated link, applied to a receive end device, where the method includes: when determining to switch a modulation mode of a first sub-link of an aggregated link from a first modulation mode to a second modulation mode, determining a transmission delay of transmitting a data slice in the second modulation mode by using the first sub-link; comparing the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link; and if the difference meets a preset condition, sending information for controlling a working status of the first sub-link to a transmit end device, so that the transmit end device controls the working status of the first sub-link in the second modulation mode.

According to a fourth aspect, the present disclosure provides a method for adjusting a working status of an aggregated link, applied to a transmit end device, where the method includes: when a receive end device determines to switch a modulation mode of a first sub-link of an aggregated link from a first modulation mode to a second modulation mode, and determines that a difference between a transmission delay of transmitting a data slice in the second modulation mode by using the first sub-link and a transmission delay of transmitting a data slice by using another sub-link of the aggregated link meets a preset condition, receiving information that is for controlling a working status of the first sub-link and that is sent by the receive end device, where the another sub-link includes a sub-link that is currently in an enabled state in the aggregated link; and controlling the working status of the first sub-link in the second modulation mode.

BRIEF DESCRIPTION OF DRAWINGS

To describe the technical solutions in the embodiments of the present disclosure, the following briefly describes the accompanying drawings for describing the embodiments. The accompanying drawings in the following description show merely some embodiments of the present disclosure, and a person of ordinary skill in the art may still derive other drawings from these accompanying drawings without creative efforts.

FIG. 10B is another signaling flowchart of a method for adjusting a working status of an aggregated link according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
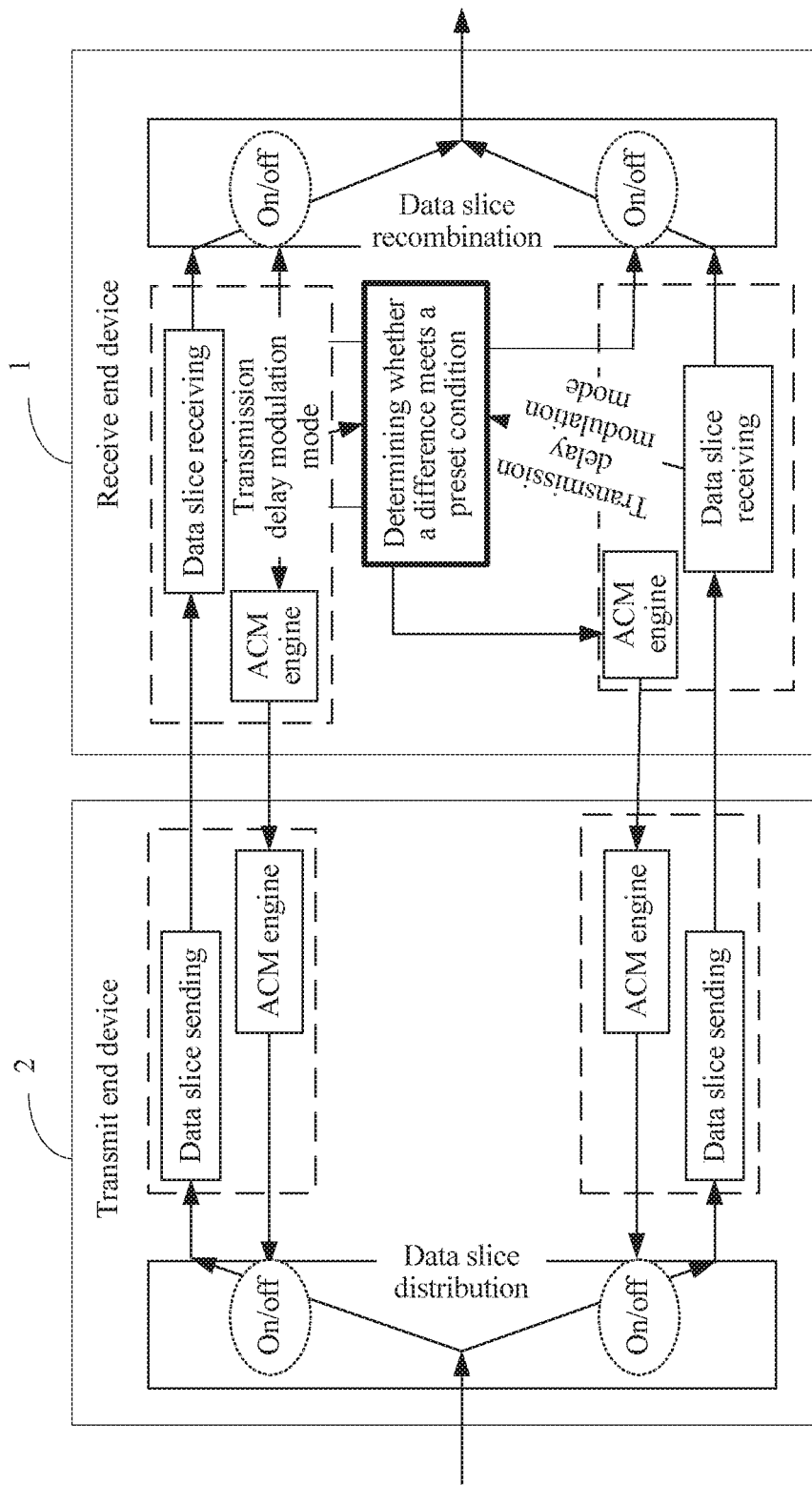
FIG. 1 is a structural block diagram of a system for implementing a method for adjusting a working status of an aggregated link according to an embodiment of the present disclosure.

FIG. 1 is a structural block diagram of a system for implementing a method for adjusting a working status of an aggregated link according to an embodiment of the present disclosure. Referring to FIG. 1, the system may include: a receive end device 1 and a transmit end device 2. Based on an ACM technology, data transmission is performed between the receive end device 1 and the transmit end device 2 by using the aggregated link.

As shown in FIG. 1, when sending data, the transmit end device 2 performs slicing processing on the data, and after data slices are distributed to sub-links of the aggregated link, the transmit end device 2 sends, by using a network, the data slices that are distributed to the sub-links to the receive end device 1.

After receiving the data slices by using the sub-links of the aggregated link, the receive end device 1 performs data recombination according to serial numbers of the data slices received by using the sub-links.

Figure 2:
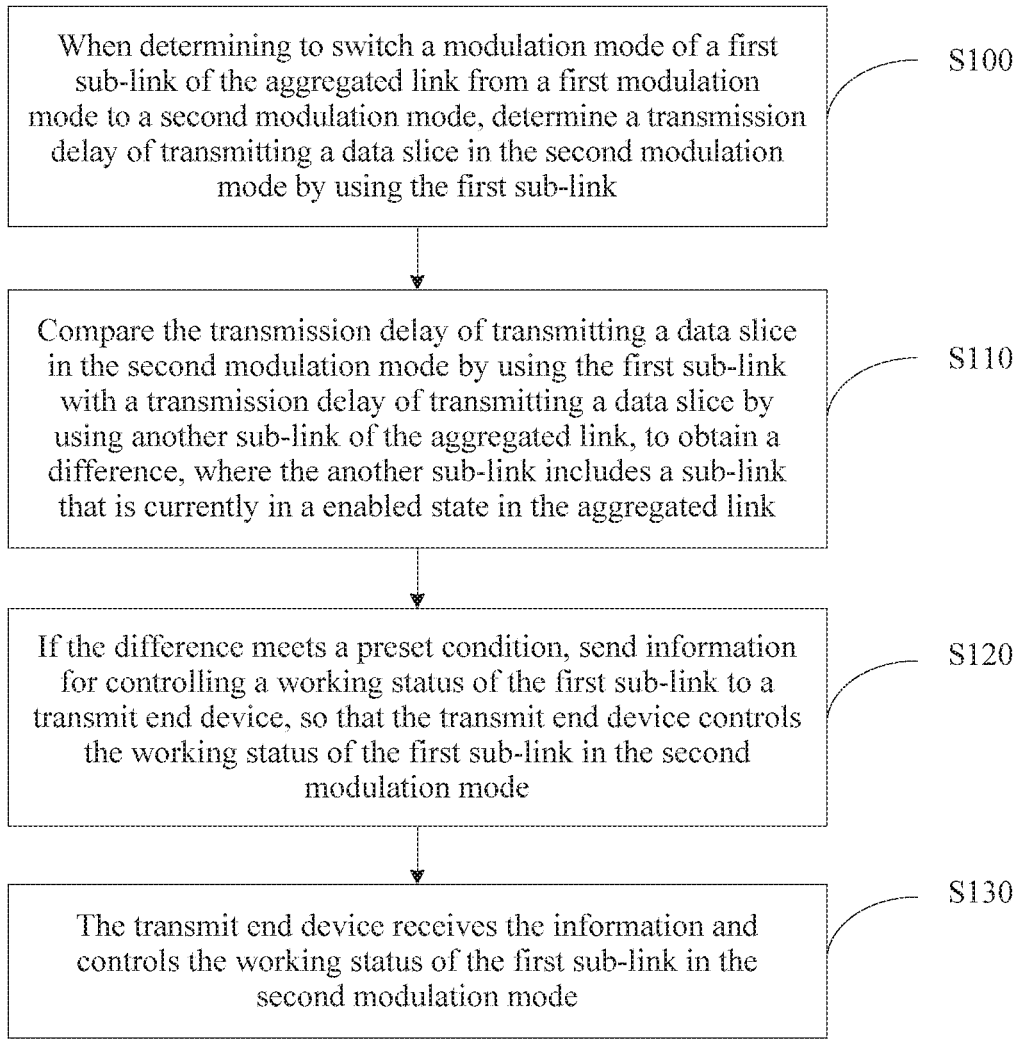
FIG. 2 is a flowchart of a method for adjusting a working status of an aggregated link according to an embodiment of the present disclosure.

Based on the system shown in FIG. 1, FIG. 2 shows a flowchart of a method for adjusting a working status of an aggregated link according to an embodiment of the present disclosure. Referring to FIG. 2, the method may include the following steps.

Step S100: When determining to switch a modulation mode of a first sub-link of the aggregated link from a first modulation mode to a second modulation mode, determine a transmission delay of transmitting a data slice in the second modulation mode by using the first sub-link.

Optionally, the first sub-link may be a sub-link whose channel quality changes and whose modulation mode needs to be adjusted in the aggregated link. The first sub-link described in this specification represents this type of the sub-link whose channel quality changes and whose modulation mode needs to be adjusted. There may be multiple first sub-links. The first modulation mode represents a sub-link existing before a modulation mode of the first sub-link is adjusted, and does not indicate a specific modulation mode. A second sub-link represents a sub-link existing after a modulation mode of the first sub-link is adjusted, and does not indicate a specific modulation mode. Optionally, because channel quality of another currently enabled sub-link of the aggregated link does not change, a modulation mode of the another currently enabled sub-link may remain unchanged.

A receive end device may switch a modulation mode of a first sub-link from a first modulation mode to a second modulation mode when channel quality of the first sub-link changes. This includes one of the following situations: When the channel quality of the first sub-link increases, the modulation mode is upward adjusted, and correspondingly, a data volume that is carried in a coding manner used in the second modulation mode is higher than a data volume that is carried in a coding manner used in the first modulation mode; or, when the channel quality of the first sub-link decreases or degrades, the modulation mode is downward adjusted, and correspondingly, a data volume that is carried in a coding manner used in the second modulation mode is lower than a data volume that is carried in a coding manner used in the first modulation mode. In this embodiment of the present disclosure, different modulation modes correspond to different coding manners, and sizes of data volumes that can be carried in different coding manners are different.

Optionally, the first sub-link may be a currently enabled sub-link or a currently disabled sub-link. Regardless of whether the first sub-link is in an enabled state or a disabled state, a current modulation mode of the first sub-link may be set to the first modulation mode, and the second modulation mode is a modulation mode obtained after a modulation mode adjustment is performed.

Optionally, by determining a difference between time in which a data slice is received in the second modulation mode by using the first sub-link and time in which a data slice is sent in the second modulation mode by using the first sub-link, the receive end device may determine a transmission delay of transmitting a data slice in the second modulation mode by using the first sub-link.

Optionally, after a link is set up, a transmission delay of transmitting a data slice by using the link is basically fixed, and generally, an error is relatively small. Therefore, in this embodiment of the present disclosure, history information about a transmission delay of transmitting a data slice in the second modulation mode by using each sub-link of the aggregated link may be pre-stored in the receive end device, so that the transmission delay of transmitting a data slice in the second modulation mode by using the first sub-link is determined according to the history information about the transmission delay of transmitting a data slice in the second modulation mode by using each sub-link of the aggregated link.

Further, the receive end device may pre-store history information about a transmission delay of transmitting a data slice in each modulation mode by using each sub-link of the aggregated link. As a result, when a modulation mode changes, a transmission delay of transmitting a data slice in a changed modulation mode by using each sub-link is determined according to history information about the transmission delay of transmitting a data slice in the changed modulation mode by using each sub-link.

Step S110: Compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link.

That the first sub-link is a currently enabled sub-link is used as an example. It is assumed that the aggregated link currently includes three sub-links that are in enabled states, and all current modulation modes are first modulation modes (it is possible that all the modulation modes of the three sub-links are different, but, in this specification, for ease of description, it is assumed that all the three sub-links have a same modulation mode, which is a corresponding first modulation mode existing when a modulation mode adjustment is not performed on the first sub-link). When channel quality of a sub-link 1 changes and a modulation mode needs to be adjusted to the second modulation mode, in this embodiment of the present disclosure, a transmission delay of transmitting a data slice in the second modulation mode by using the sub-link 1 and a transmission delay of transmitting a data slice in the first modulation mode by using another sub-link (a sub-link 2 or a sub-link 3) may be compared to obtain a difference.

Step S120: If the difference meets a preset condition, send information for controlling a working status of the first sub-link to a transmit end device, so that the transmit end device controls the working status of the first sub-link in the second modulation mode.

Optionally, that the difference meets a preset condition may mean that the difference is greater than a preset threshold or less than or equal to a preset threshold.

Controlling a working status of the first sub-link includes disabling the first sub-link (this is corresponding to a case in which the first sub-link is currently in an enabled state) or enabling the first sub-link (this is corresponding to a case in which the first sub-link is currently in a disabled state).

Optionally, the receive end device may send, by using a built-in ACM engine, information for controlling the working status of the first sub-link to a built-in ACM engine of the transmit end device, so that the transmit end device switches the modulation mode of the first sub-link and controls the working status of the first sub-link.

Step S130: The transmit end device receives the information and controls the working status of the first sub-link in the second modulation mode.

Optionally, in this embodiment of the present disclosure, a manner of determining a transmission delay of transmitting a data slice in the second modulation mode by using the first sub-link may be determining the transmission delay according to history information about the transmission delay of transmitting a data slice in the second modulation mode by using the first sub-link, and the implementation does not necessarily require the transmit end device to send a data slice in the second modulation mode by using the first sub-link. However, because quality of a network channel is changeable, an error exists in the manner of determining a transmission delay according to history information about the transmission delay. Therefore a manner of determining a transmission delay by using a time difference between time for sending, by the transmit end device, data in the second modulation mode by using the first sub-link and time for receiving, by the receive end device, the data in the second modulation mode by using the first sub-link is more accurate.

In this embodiment of the present disclosure, the receive end device determines a working status of the first sub-link after the modulation mode of the first sub-link is switched to the second modulation mode, and after the receive end device determines the working status of the first sub-link in the second modulation mode, the transmit end device adjusts the modulation mode of the first sub-link (this is implemented by disabling or enabling the first sub-link, so that a data slice is transmitted by using the first sub-link or without using the first sub-link). The transmit end device may switch the modulation mode of the first sub-link to the second modulation mode when information that is for controlling the working status of the first sub-link and that is sent by the receive end device is received. Correspondingly, the receive end device may send, by using a built-in ACM engine, information for controlling the working status of the first sub-link to a built-in ACM engine of the transmit end device, and the transmit end device switches the modulation mode and controls the working status of the first sub-link.

It should be noted that, if the receive end device and the transmit end device transmit data by using a microwave air interface network, the receive end device may determine, by using a difference between sending time for sending microwave data in the second modulation mode by using the first sub-link and receiving time for receiving the microwave data, a transmission delay of transmitting a data slice in the second modulation mode by using the first sub-link. Time when the receive end device determines the transmission delay of transmitting a data slice in the second modulation mode by using the first sub-link is time when the microwave data is received and the microwave data has not been converted into packet slices. If the receive end device determines that the first sub-link is a sub-link that needs to be disabled, the receive end device may stop receiving a data slice converted from the microwave data, and send information for disabling the first sub-link to the transmit end device, so as to predetermine a transmission delay situation of the first sub-link before data slices are recombined and adjust the aggregated link before the data slices are recombined.

Figure 3:
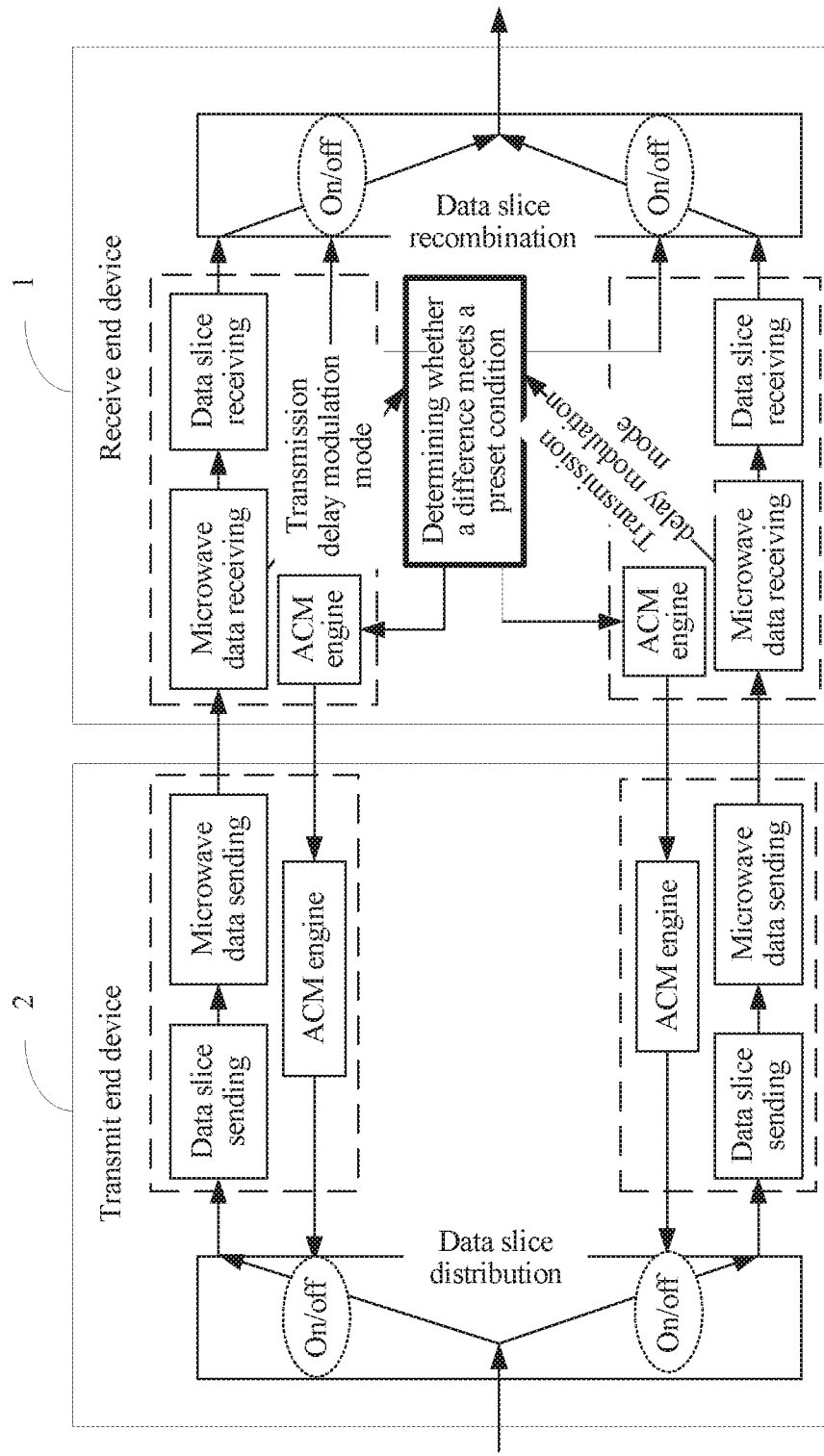
FIG. 3 is a structural block diagram of another system for implementing a method for adjusting a working status of an aggregated link according to an embodiment of the present disclosure.

The following uses an example in which a receive end device 1 and a transmit end device 2 transmit data by using a microwave air interface network. As shown in FIG. 3, when sending data, the transmit end device 2 performs slicing processing on the data and allocates data slices to sub-links of an aggregated link. When the data slices are being distributed by using the sub-links of the aggregated link, microwave data conversion processing is performed on the data slices, and then the data slices that are converted into the microwave data are sent to the receive end device 1 by using the microwave air interface network and by using corresponding sub-links.

After receiving, by using the sub-links of the aggregated link, the data slices that are converted into the microwave data, the receive end device 1 converts the microwave data into data slices, and then performs data recombination according to serial numbers of the data slices received by using the sub-links.

Figure 4:
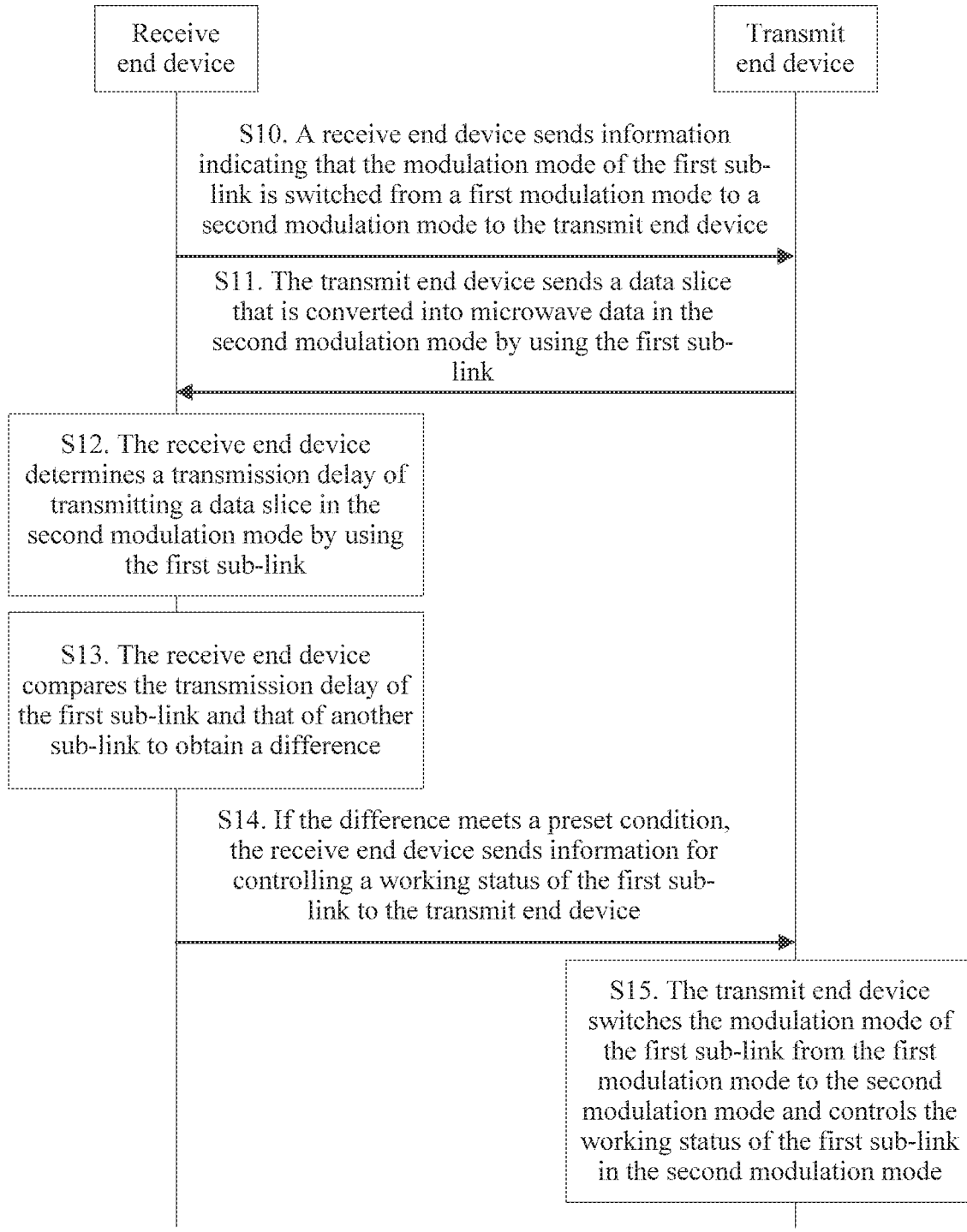
FIG. 4 is a signaling flowchart of a method for adjusting a working status of an aggregated link according to an embodiment of the present disclosure.

Based on the description shown in FIG. 3, FIG. 4 shows a signaling flowchart of a method for adjusting a working status of an aggregated link according to an embodiment of the present disclosure. Referring to FIG. 4, a signaling process may include the following steps.

Step S10: When determining to switch a modulation mode of a first sub-link from a first modulation mode to a second modulation mode, a receive end device sends information indicating that the modulation mode of the first sub-link is switched from the first modulation mode to the second modulation mode to a transmit end device.

In this embodiment of the present disclosure, when channel quality of the first sub-link changes, a modulation mode may be adjusted, and the modulation mode of the first sub-link may be switched from the current first modulation mode to the second modulation mode. The receive end device may send an instruction for switching the modulation mode of the first sub-link to the transmit end device. It should be noted that, if the channel quality increases, the first sub-link may be a currently disabled sub-link, and a modulation mode existing when the first sub-link is disabled is the first modulation mode; or if the channel quality decreases or degrades, the first sub-link may be a currently enabled sub-link, and a current modulation mode existing when the first sub-link is enabled is the first modulation mode.

Step S11: After receiving the information, the transmit end device sends, in the second modulation mode by using the first sub-link, a data slice that is converted into microwave data.

Step S12: The receive end device receives, by using the first sub-link, the data slice that is converted into the microwave data, and determines a transmission delay of transmitting a data slice in the second modulation mode by using the first sub-link.

Step S13: The receive end device compares the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link.

In this embodiment of the present disclosure, an object that is used to perform transmission delay comparison with the first sub-link is another sub-link that is currently enabled in the current aggregated link. Optionally, the another sub-link may be a sub-link that is different from the first sub-link and that is currently in an enabled state in the aggregated link. Optionally, a modulation mode of the another sub-link may not be adjusted when the first sub-link adjusts the modulation mode.

Step S14: If the difference meets a preset condition, the receive end device sends information for controlling a working status of the first sub-link to the transmit end device.

Optionally, controlling a working status of the first sub-link includes disabling the first sub-link and enabling the first sub-link. If controlling the working status of the first sub-link includes disabling the first sub-link, the receive end device may stop receiving microwave data by using the first sub-link; or if controlling the working status of the first sub-link includes enabling the first sub-link, the receive end device may receive microwave data by using the first sub-link.

Step S15: The transmit end device receives the information for controlling the working status of the first sub-link, switches the modulation mode of the first sub-link from the first modulation mode to the second modulation mode, and controls the working status of the first sub-link in the second modulation mode.

Obviously, if the receive end device determines that the first sub-link is a sub-link that needs to be disabled in the sub-links whose current channel quality changes, the receive end device may determine, at a stage of receiving microwave data, data slices converted from the microwave data and further stops receiving the data slices, so as to predetermine a transmission delay situation of the sub-link before the data slices are recombined and adjust the aggregated link before the data slices are recombined, so as to disable a sub-link whose transmission delay is relatively large and reduce delay time of data recombination.

Obviously, in this embodiment of the present disclosure, a transmission delay of transmitting a data slice in the second modulation mode by using the first sub-link may be determined by using history information about the transmission delay of transmitting a data slice in the second modulation mode by using the first sub-link.

Obviously, in this embodiment of the present disclosure, data transmission may be implemented without using a microwave air interface network. For example, data transmission may be implemented by directly transmitting a data slice on a sub-link, and correspondingly, the transmit end device may directly distribute data slices to sub-links for transmitting without converting the data slices into microwave data to distribute the data slices to the sub-links for transmitting; and correspondingly, the receive end device may directly receive the data slices by using the sub-links, without a requirement for first receiving the microwave data and then converting the microwave data into data slices.

In a method for adjusting a working status of an aggregated link provided in this embodiment of the present disclosure, when determining that a modulation mode of a first sub-link of an aggregated link needs to be switched, for example, to be switched from a first modulation mode to a second modulation mode, a receive end device may determine a transmission delay of transmitting a data slice in the second modulation mode by using the first sub-link, and compare the transmission delay of transmitting a data slice in the second modulation mode by using the first sub-link with a transmission delay of transmitting a data slice by using another sub-link of the aggregated link, to obtain a difference, so as to send information for controlling a working status of the first sub-link to a transmit end device when the difference meets a preset condition. After receiving the information, the transmit end device controls the working status of the first sub-link in the second modulation mode. In this embodiment of the present disclosure, according to a difference between a data transmission delay of a first sub-link and that of another sub-link, control of enabling and disabling the first sub-link may be implemented, an adjustment of a data slice distribution policy may be achieved, transmission performance of delay/jitter-sensitive services such as a voice service and a video service may be ensured, and an impact, on a delay-difference-sensitive service, caused because a sub-link delay difference changes after switching of a modulation mode can be reduced, so that the services such as the voice service and the video service can be normally used.

From a perspective of a receive end device, the following describes a method for adjusting a working status of an aggregated link provided in this embodiment of the present disclosure, and content described in the following and the content described in the above can be mutually referenced.

Figure 5:
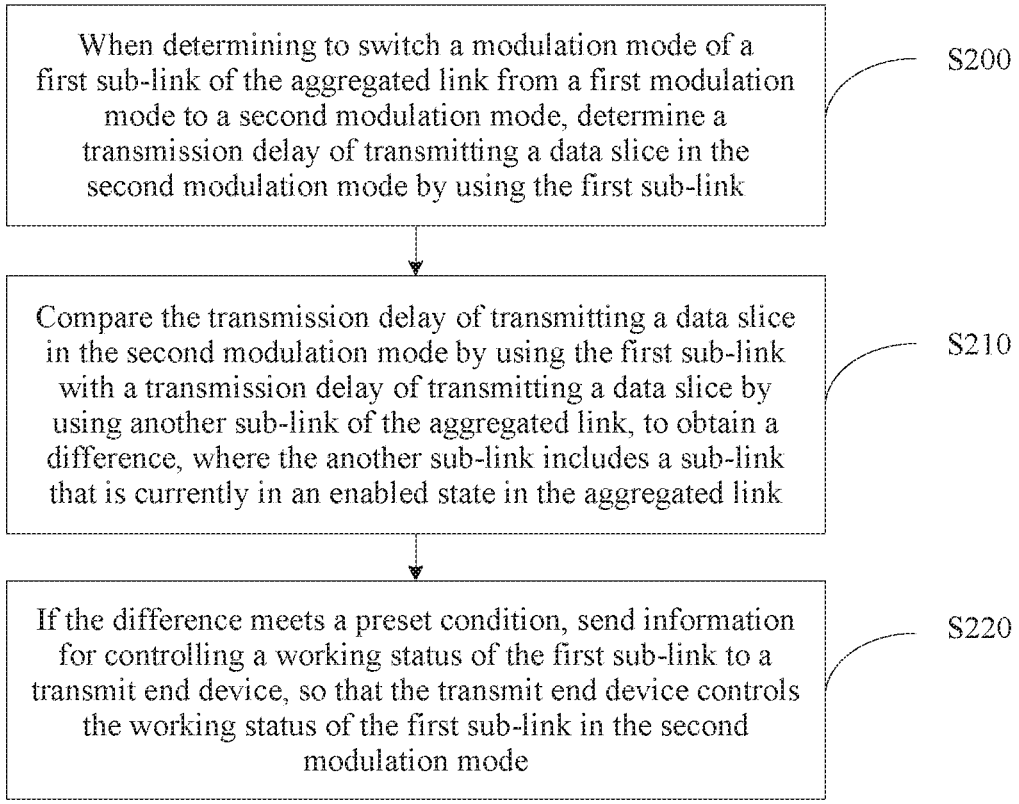
FIG. 5 is another flowchart of a method for adjusting a working status of an aggregated link according to an embodiment of the present disclosure.

FIG. 5 is another flowchart of a method for adjusting a working status of an aggregated link according to an embodiment of the present disclosure. Referring to FIG. 5, the method may include the following steps.

Step S200: When determining to switch a modulation mode of a first sub-link of the aggregated link from a first modulation mode to a second modulation mode, determine a transmission delay of transmitting a data slice in the second modulation mode by using the first sub-link.

Optionally, the transmission delay of transmitting a data slice in the second modulation mode by using the first sub-link may be determined when the receive end device receives, from a network, the data slice transmitted by using the first sub-link. Using a microwave air interface network as an example, the transmission delay may be determined when the receive end device receives microwave data transmitted by using the first sub-link.

Optionally, in this embodiment of the present disclosure, the transmission delay of transmitting a data slice in the second modulation mode by using the first sub-link may be determined according to pre-stored history information about the transmission delay of transmitting a data slice in the second modulation mode by using the first sub-link of the aggregated link. When the modulation mode is the second modulation mode, the receive end device may record a receiving time stamp indicating when a data slice sent by using each sub-link is received, determine a difference between the receiving time stamp corresponding to each sub-link and a sending time stamp carried in the data slice sent by using each sub-link as a transmission delay of transmitting a data slice by using each sub-link, and pre-store, in a database, the determined transmission delay of transmitting a data slice by using each sub-link, so as to pre-store the history information about the transmission delay of transmitting a data slice in the second modulation mode by using the first sub-link of the aggregated link.

Further, if a difference exists between recorded transmission delays in which a sub-link transmits data slices in a second modulation mode multiple times, an average value of the transmission delays in which the sub-link transmits the data slices in the second modulation mode multiple times may be used as history information about the transmission delays in which the sub-link transmits the data slices in the second modulation mode.

Step S210: Compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link.

Step S220: If the difference meets a preset condition, send information for controlling a working status of the first sub-link to a transmit end device, so that the transmit end device controls the working status of the first sub-link in the second modulation mode.

Optionally, in this embodiment of the present disclosure, a threshold may be set, that the difference meets the preset condition may mean that the difference is greater than the threshold or that the difference is less than or equal to the threshold respectively according to downward adjustment of the modulation mode or upward adjustment of the modulation mode. Controlling the working status of the first sub-link may be disabling the first sub-link or enabling the first sub-link respectively according to downward adjustment of the modulation mode or upward adjustment of the modulation mode.

Figure 6:
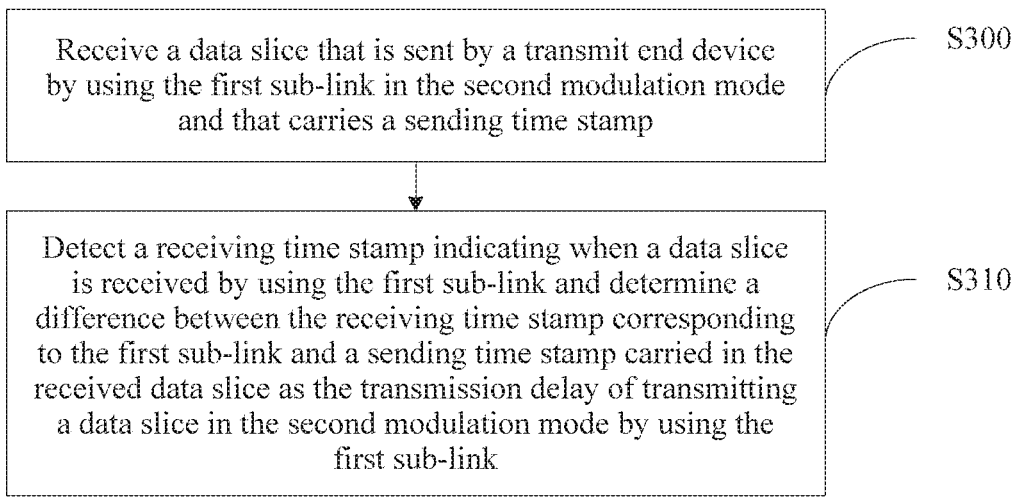
FIG. 6 is a flowchart of a method for determining a transmission delay according to an embodiment of the present disclosure.

Optionally, a transmission delay of transmitting a data slice in a second modulation mode by using each sub-link may be obtained after inspecting by using an operations, administration, and maintenance (OAM) algorithm such as 802.1ag. A basic principle is that the transmit end device sends, in the second modulation mode, a data slice which carries a time stamp, and the receive end device extracts the time stamp from the received data slice to perform a comparison with a local time stamp and computes the data transmission delay of the sub-link. Optionally, FIG. 6 shows a flowchart of a method for determining a transmission delay of transmitting a data slice in a second modulation mode by using a first sub-link. Referring to FIG. 6, the method may include the following steps.

Step S300: Receive a data slice that is sent by a transmit end device in the second modulation mode by using the first sub-link and that carries a sending time stamp.

Optionally, after determining to switch a modulation mode of the first sub-link, a receive end device may send information indicating that the modulation mode of the first sub-link is switched from a first modulation mode to the second modulation mode to the transmit end device. After receiving the information, the transmit end device adds a sending time stamp to a data slice, and sends the data slice in the second modulation mode by using the first sub-link.

Step S310: Detect a receiving time stamp indicating when a data slice is received by using the first sub-link, and determine a difference between the receiving time stamp corresponding to the first sub-link and a sending time stamp carried in the received data slice as the transmission delay of transmitting a data slice in the second modulation mode by using the first sub-link.

After receiving a data slice by using the first sub-link, the receive end device may extract a sending time stamp from the data slice received by using the first sub-link, perform a comparison between the sending time stamp and a receiving time stamp indicating when the data slice is received by using the first sub-link, and obtain a difference between the receiving time stamp corresponding to the first sub-link and the sending time stamp carried in the received data slice. The difference is the transmission delay of transmitting a data slice in the second modulation mode by using the first sub-link.

If a receiving time stamp indicating when the receive end device receives a data slice by using the first sub-link is t1 and a sending time stamp extracted from the received data slice is t2, the transmission delay of transmitting a data slice in the second modulation mode by using the first sub-link is t1 minus t2.

If the receive end device and the transmit end device transmit data by using a microwave air interface network, after the transmit end device sends microwave data, a delay consists of two parts:

(1) A microwave data transmission delay: $T1=2*($a slice length/a link bandwidth$)$. The microwave data transmission delay includes a delay from time in which the transmit end device sends microwave data and time in which the receive end device receives the microwave data. Because link bandwidths in different modulation modes are different, transmission delays in different modulation modes are also different.

(2) An air interface transmission delay: $T2=$ an air interface transmission length/an air interface transmission rate. This part of time is basically fixed after a device is deployed.

Therefore, the data transmission delay of the first sub-link in the second modulation mode may be determined by using a difference between a sending time stamp indicating when microwave data is sent and a receiving time stamp indicating when the microwave data is received.

Figure 7:
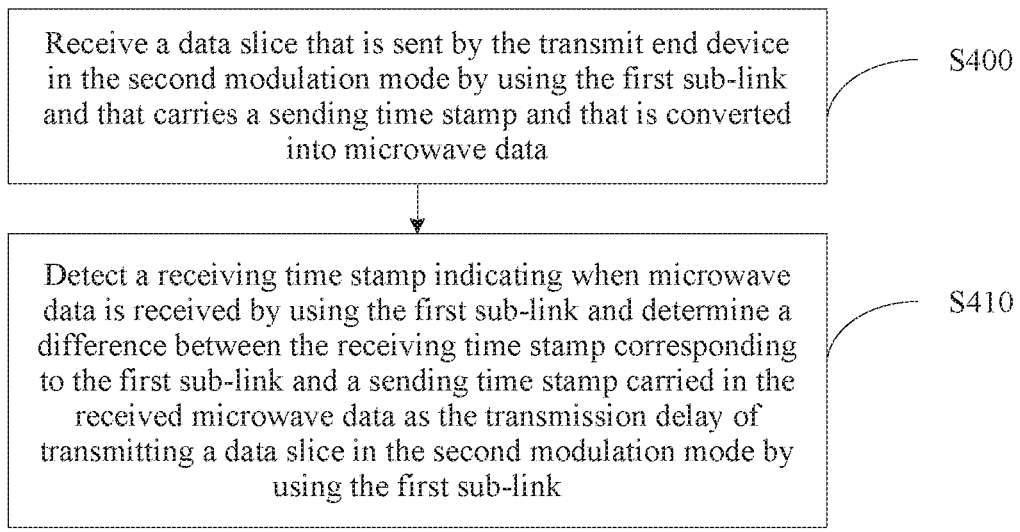
FIG. 7 is a flowchart of another method for determining a transmission delay according to an embodiment of the present disclosure.

Correspondingly, FIG. 7 shows a flowchart of another method for determining a data transmission delay of a first sub-link in a second modulation mode. Referring to FIG. 7, the method may include the following steps.

Step S400: Receive a data slice that is sent by the transmit end device in the second modulation mode by using the first sub-link and that carries a sending time stamp and that is converted into microwave data.

Optionally, when sending data slices by using sub-links, the transmit end device may convert the data slices into microwave data, obtain the data slices that are converted into the microwave data, and send the microwave data in a corresponding sub-link by using a microwave air interface network; and may add a time stamp indicating sending time (that is, a sending time stamp) to the microwave data at the same time when the microwave data is being sent. The receive end device receives the microwave data and may extract the sending time stamp carried in the microwave data.

It should be noted that, whether the receive end device performs data recombination on received data slices converted from the microwave data needs to be determined according to a difference between a transmission delay of a sub-link and that of another sub-link when the microwave data is received. This is to be described in detail in the following again.

Step S410: Detect a receiving time stamp indicating when microwave data is received by using the first sub-link, and determine a difference between the receiving time stamp corresponding to the first sub-link and a sending time stamp carried in the received microwave data as the transmission delay of transmitting a data slice in the second modulation mode by using the first sub-link.

Optionally, in this embodiment of the present disclosure, the reason why the modulation mode of the first sub-link is switched may be that channel quality of the first sub-link decreases and the modulation mode needs to be downward adjusted. Correspondingly, the first sub-link includes an enabled sub-link (that is, the first sub-link is currently enabled). In this embodiment of the present disclosure, the first sub-link whose transmission delay is relatively large may be disabled when a difference between the transmission delay of transmitting a data slice in the second modulation mode by using the first sub-link and a transmission delay of transmitting a data slice by using the another sub-link is greater than a threshold, so as to reduce a recombination delay of the data slice and reduce an impact on a delay-difference-sensitive service.

Figure 8:
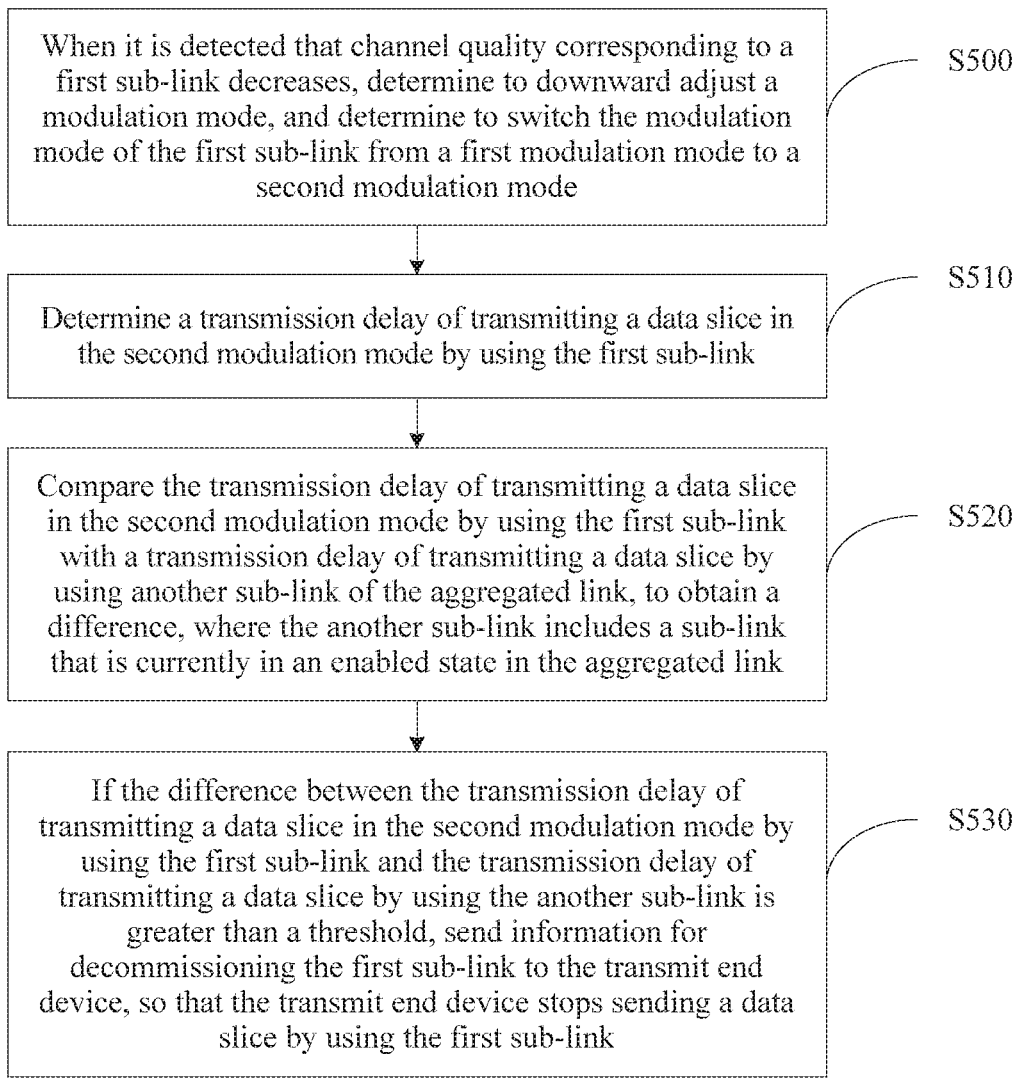
FIG. 8 is still another flowchart of a method for adjusting a working status of an aggregated link according to an embodiment of the present disclosure.

FIG. 8 is still another flowchart of a method for adjusting a working status of an aggregated link according to an embodiment of the present disclosure. Referring to FIG. 8, the method may include the following steps.

Step S500: When it is detected that channel quality corresponding to a first sub-link decreases, determine to downward adjust a modulation mode, and determine to switch the modulation mode of the first sub-link from a first modulation mode to a second modulation mode, where a data volume carried in a coding manner of the second modulation mode is lower than a data volume carried in a coding manner of the first modulation mode.

That the channel quality decreases may mean degradation of quality of a microwave air interface channel, or the like. In this embodiment of the present disclosure, different modulation modes correspond to different coding manners. When the channel quality decreases, the modulation mode is downward adjusted and a data volume that can be carried in a coding manner of the modulation mode is decreased. Correspondingly, a data volume that can be carried in the coding manner of the original first modulation mode is higher than a data volume that can be carried in the coding manner of the adjusted second modulation mode.

Step S510: Determine a transmission delay of transmitting a data slice in the second modulation mode by using the first sub-link.

Optionally, referring to FIG. 6 and FIG. 7, a determining method may be determining in real time or may be determining according to pre-stored history information about the transmission delay of transmitting a data slice in the second modulation mode by using the first sub-link.

Step S520: Compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link.

Step S530: If the difference between the transmission delay of transmitting a data slice in the second modulation mode by using the first sub-link and the transmission delay of transmitting a data slice by using the another sub-link is greater than a threshold, send information for disabling the first sub-link to the transmit end device, so that the transmit end device stops sending a data slice by using the first sub-link.

For ease of understanding, using an aggregated link that includes three currently enabled sub-links as an example, current modulation modes of all the sub-links are first modulation modes (in some embodiments, the current modulation modes of the sub-links may be different). A first sub-link is a sub-link whose channel quality decreases and whose modulation mode needs to be downward adjusted. If a data transmission delay of the first sub-link in a second modulation mode is 7.5 ms; a modulation mode of a second sub-link is not adjusted and a data transmission delay of the second sub-link in the first modulation mode is 7 ms; a modulation mode of a third sub-link is not adjusted and a data transmission delay of the third sub-link in the first modulation mode is 6.4 ms; and a threshold is 1 ms, a difference between the data transmission delay of the first sub-link and that of the third sub-link is 1.1 ms and is greater than 1 ms. It may be learned that, after the channel quality decreases and the modulation mode is adjusted, the data transmission delay of the first sub-link is to increase and is not to be applicable for usage again, and needs to be disabled in the aggregated link. There may be multiple first sub-links, and in this embodiment of the present disclosure, the multiple sub-links may be disabled.

After receiving the information for disabling the first sub-link, the transmit end device disables the first sub-link in the second modulation mode and does not distribute a data slice to the first sub-link again.

Correspondingly, the receive end device stops receiving information from the first sub-link but receives data slices from the another sub-link, and perform data recombination on the data slices received from the another sub-link.

In a method for adjusting a working status of an aggregated link provided in this embodiment of the present disclosure, when a modulation mode is downward adjusted, a transmission delay of transmitting a data slice in a downward adjusted second modulation mode by using a first sub-link may be determined, so as to compare the transmission delay of transmitting a data slice in the second modulation mode by using the first sub-link with a transmission delay of transmitting a data slice by using another sub-link, to obtain a difference, and further disable the first sub-link when the difference is greater than a threshold, so that a transmit end device does not send a data slice by using the first sub-link, and a receive end device does not receive a data slice by using the first sub-link. This reduces recombination delay time of the data slice and reduces an impact, on a delay-difference-sensitive service, caused because a sub-link delay difference changes, so that services such as a voice service and a video service can be normally used.

Optionally, in this embodiment of the present disclosure, the reason why a modulation mode is switched may be that channel quality increases and the modulation mode needs to be upward adjusted. Correspondingly, a first sub-link includes a disabled sub-link (that is, the first sub-link is currently disabled). In this embodiment of the present disclosure, the disabled first sub-link may be enabled when a difference between a data transmission delay of the disabled first sub-link in a second modulation mode and a transmission delay of another sub-link is less than or equal to a threshold, so that more sub-links in the aggregated link transmit data slices, so as to reduce transmission time of the data slices.

Figure 9:
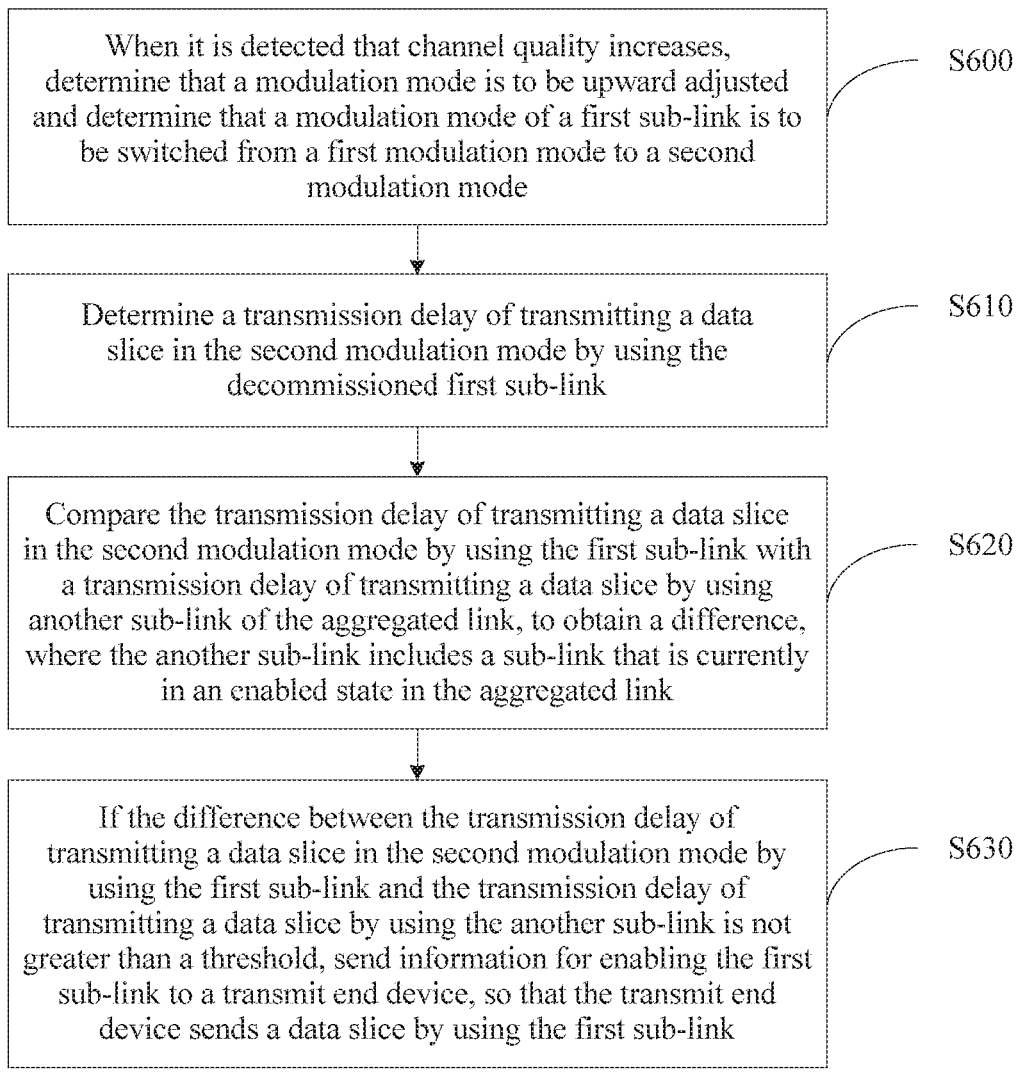
FIG. 9 is yet another flowchart of a method for adjusting a working status of an aggregated link according to an embodiment of the present disclosure.

FIG. 9 is yet another flowchart of a method for adjusting a working status of an aggregated link according to an embodiment of the present disclosure. Referring to FIG. 9, the method may include the following steps.

Step S600: When it is detected that channel quality increases, determine that a modulation mode is to be upward adjusted and determine that a modulation mode of a first sub-link is to be switched from a first modulation mode to a second modulation mode, where a data volume that is carried in a coding manner of the second modulation mode is higher than a data volume that is carried in a coding manner of the first modulation mode.

That the channel quality increases may mean an increase of quality of a microwave air interface channel, or the like. In this embodiment of the present disclosure, different modulation modes correspond to different coding manners. When the channel quality increases, the modulation mode is upward adjusted and a data volume that can be carried in a coding manner of the modulation mode is increased. Correspondingly, a data volume that can be carried in the coding manner of the original first modulation mode is lower than a data volume that can be carried in the coding manner of the adjusted second modulation mode.

Step S610: Determine a transmission delay of transmitting a data slice in the second modulation mode by using the disabled first sub-link.

Step S620: Compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link.

Step S630: If the difference between the transmission delay of transmitting a data slice in the second modulation mode by using the first sub-link and the transmission delay of transmitting a data slice by using the another sub-link is less than or equal to a threshold, send information for enabling the first sub-link to a transmit end device, so that the transmit end device sends a data slice by using the first sub-link.

For ease of understanding, using an aggregated link that includes three sub-links as an example, a first sub-link is disabled and in a first modulation mode. If a data transmission delay of the first sub-link in a second modulation mode is 7 ms after channel quality of the first sub-link increases and a modulation mode of the first sub-link is upward adjusted; a modulation mode of a second sub-link is not adjusted and a data transmission delay of the second sub-link is 6.5 ms; and a modulation mode of a third sub-link is not adjusted and a data transmission delay of the third sub-link is 6.4 ms, delay differences between data transmission delays of all sub-links are less than or equal to 1 ms (a threshold is 1 ms). It may be learned that, after the channel quality increases and the modulation mode is upward adjusted, the data transmission delay of the first sub-link is relatively small and the first sub-link may be enabled again.

After receiving the information for enabling the first sub-link, the transmit end device enables the first sub-link in the second modulation mode and distributes a data slice to the first sub-link.

Correspondingly, the receive end device receives information by using the first sub-link, and performs data recombination on data slices received by using the first sub-link and the another sub-link.

In a method for adjusting a working status of an aggregated link provided in this embodiment of the present disclosure, when a modulation mode is upward adjusted and a first sub-link is disabled in a first modulation mode, a transmission delay of the first sub-link in a second modulation mode may be determined, so as to compare the transmission delay of the first sub-link in the second modulation mode with a transmission delay of another sub-link to obtain a difference. If the difference is less than or equal to a threshold, the first sub-link is enabled, so that more sub-links transmit data slices and overall transmission time of the data slices is reduced, so that a network bandwidth can be fully used.

Figure 10A:
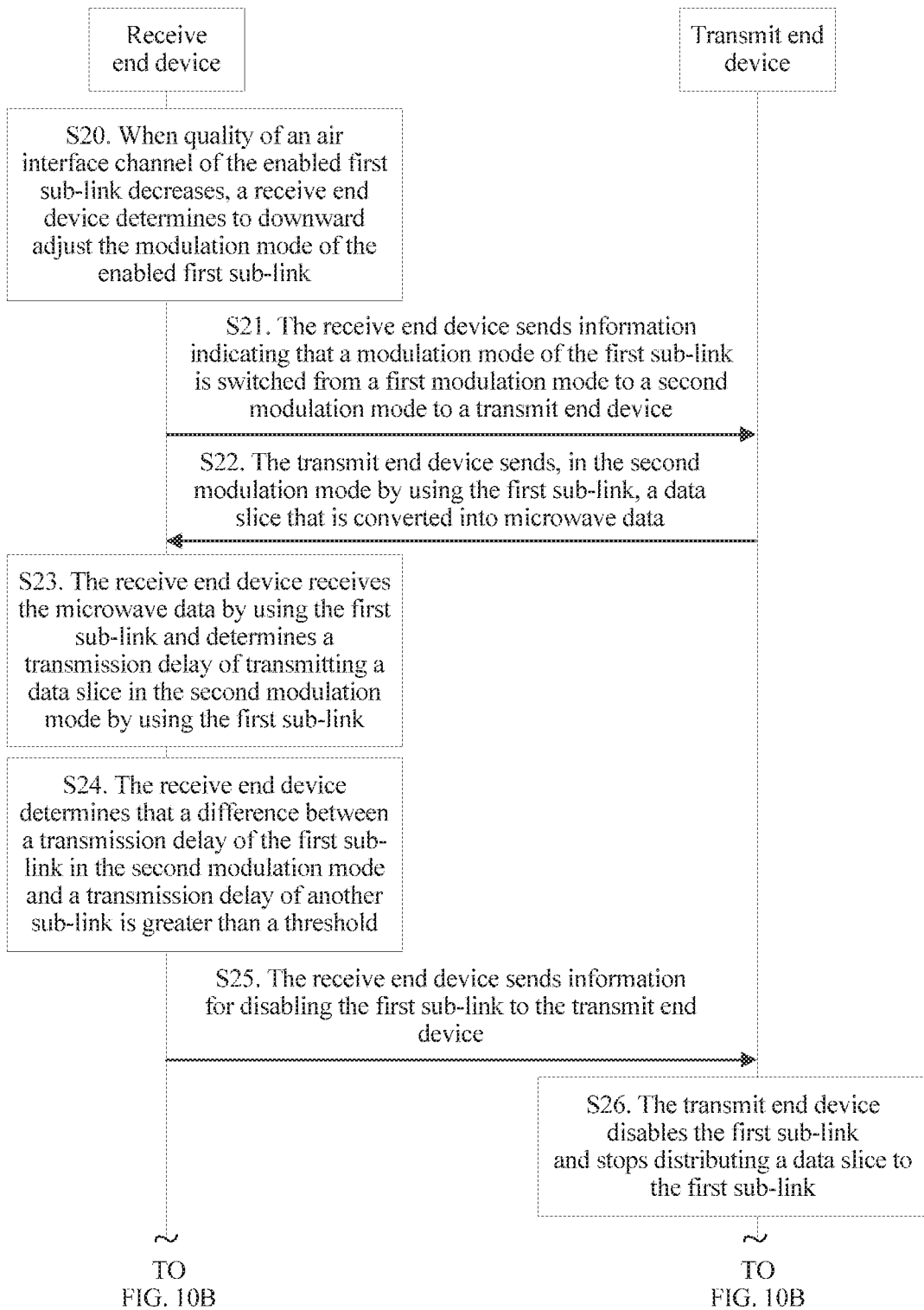
FIG. 10A is another signaling flowchart of a method for adjusting a working status of an aggregated link according to an embodiment of the present disclosure.

Optionally, based on a microwave air interface network, FIG. 10A and FIG. 10B are another signaling flowchart of a method for adjusting a working status of an aggregated link according to an embodiment of the present disclosure. Referring to FIG. 10A and FIG. 10B, a signaling process may include the following steps:

Step S20: When quality of an air interface channel of a currently enabled first sub-link decreases, a receive end device determines to downward adjust a modulation mode of the first sub-link.

Step S21: The receive end device sends information indicating that the modulation mode of the first sub-link is switched from a first modulation mode to a second modulation mode to a transmit end device.

Step S22: After receiving the information, the transmit end device sends, in the second modulation mode by using the first sub-link, a data slice that is converted into microwave data.

Step S23: The receive end device receives the microwave data by using the first sub-link, and determines a transmission delay of transmitting a data slice in the second modulation mode by using the first sub-link.

Step S24: The receive end device determines that a difference between a transmission delay of the first sub-link in the second modulation mode and a transmission delay of another sub-link is greater than a threshold.

Step S25: The receive end device sends information for disabling the first sub-link to the transmit end device and stops receiving a data slice that is converted into microwave data from the first sub-link.

Step S26: The transmit end device disables the first sub-link and stops distributing a data slice to the first sub-link.

Step S27: When the quality of the air interface channel of the first sub-link increases, the receive end device determines that the modulation mode of the disabled first sub-link is to be upward adjusted.

Step S28: The receive end device sends information indicating that the modulation mode of the first sub-link is switched from the second modulation mode to a third modulation mode to the transmit end device.

Step S29: After receiving the information, the transmit end device sends, in the second modulation mode by using the first sub-link, a data slice that is converted into microwave data.

Step S30: The receive end device receives the microwave data by using the first sub-link and determines a transmission delay of transmitting a data slice in the third modulation mode by using the first sub-link.

Step S31: The receive end device determines that a difference between a transmission delay of the first sub-link in the third modulation mode and a transmission delay of another sub-link is less than or equal to the threshold.

Step S32: The receive end device sends information for enabling the first sub-link to the transmit end device, and receives a data slice from the first sub-link.

Step S33: The transmit end device enables the disabled first sub-link in the third modulation mode, and distributes a data slice by using the first sub-link.

From a perspective of a transmit end device, the following describes a method for adjusting a working status of an aggregated link provided in this embodiment of the present disclosure, and content described in the following and the content described in the above can be mutually referenced.

Figure 11:
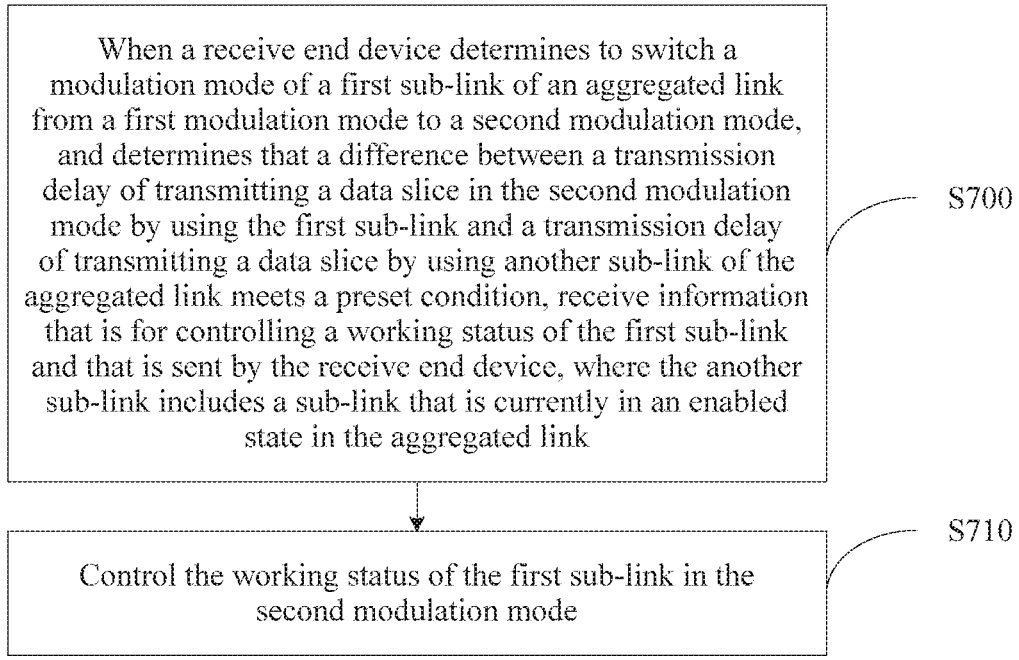
FIG. 11 is still yet another flowchart of a method for adjusting a working status of an aggregated link according to an embodiment of the present disclosure.

FIG. 11 is still yet another flowchart of a method for adjusting a working status of an aggregated link according to an embodiment of the present disclosure. Referring to FIG. 11, the method may include the following steps:

Step S700: When a receive end device determines to switch a modulation mode of a first sub-link of the aggregated link from a first modulation mode to a second modulation mode, and determines that a difference between a transmission delay of transmitting a data slice in the second modulation mode by using the first sub-link and a transmission delay of transmitting a data slice by using another sub-link of the aggregated link meets a preset condition, receive information that is for controlling a working status of the first sub-link and that is sent by the receive end device, where the another sub-link includes a sub-link that is currently in an enabled state in the aggregated link.

Step S710: Control the working status of the first sub-link in the second modulation mode.

Optionally, a manner in which the receive end device determines the transmission delay of transmitting a data slice in the second modulation mode by using the first sub-link may be the same as that described above. For example, the receive end device determines, according to pre-stored history information about a transmission delay of transmitting a data slice in the second modulation mode by using each sub-link of the aggregated link, the transmission delay of transmitting a data slice in the second modulation mode by using the first sub-link.

The manner may be as follows: The transmit end device sends a data slice to the receive end device in the second modulation mode by using the first sub-link of the aggregated link, so that the receive end device determines a difference between a receiving time stamp corresponding to the first sub-link and a sending time stamp carried in the received data slice, and the difference is the transmission delay of transmitting a data slice in the second modulation mode by using the first sub-link.

Optionally, information that is received by a transmit end device and that is used to switch a modulation mode from a first modulation mode to a second modulation mode may be information for downward adjusting the modulation mode, and the second modulation mode is lower than the first modulation mode (a data volume that is carried in a coding manner of the second modulation mode is lower than a data volume that is carried in a coding manner of the first modulation mode). Correspondingly, a first sub-link may be a currently enabled sub-link. Correspondingly, a manner in which the transmit end device receives the information that is for controlling a working status of the first sub-link and that is sent by a receive end device may be as follows: After determining that a difference between a transmission delay of transmitting a data slice in the second modulation mode by using the first sub-link and a transmission delay of transmitting a data slice by using the another sub-link is greater than a threshold, receiving information that is used to disable the first sub-link and that is sent by the receive end device.

Figure 12:
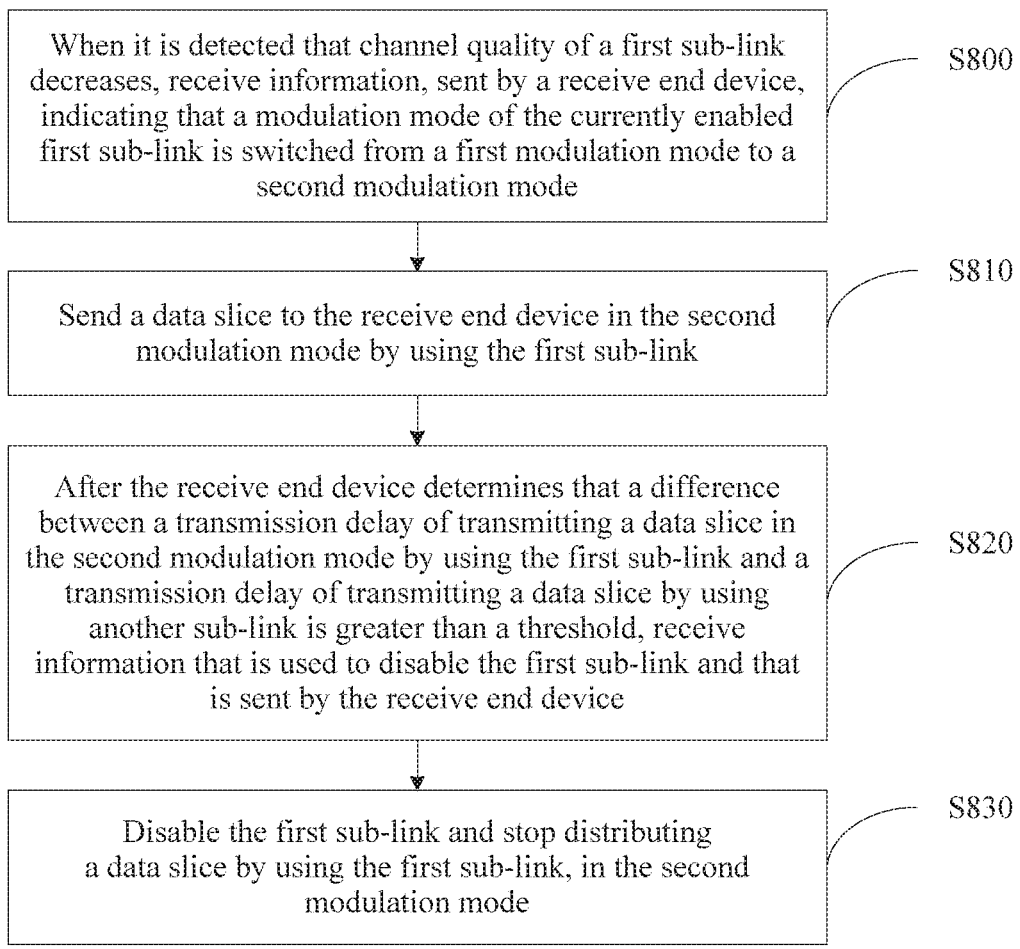
FIG. 12 is a further flowchart of a method for adjusting a working status of an aggregated link according to an embodiment of the present disclosure.

Optionally, FIG. 12 is a further flowchart of a method for adjusting a working status of an aggregated link according to an embodiment of the present disclosure. Referring to FIG. 12, the method may include the following steps.

Step S800: When it is detected that channel quality of a first sub-link decreases, receive information, sent by a receive end device, indicating that a modulation mode of the currently enabled first sub-link is switched from a first modulation mode to a second modulation mode.

Step S810: Send a data slice to the receive end device in the second modulation mode by using the first sub-link.

Step S820: After the receive end device determines that a difference between a transmission delay of transmitting a data slice in the second modulation mode by using the first sub-link and a transmission delay of transmitting a data slice by using another sub-link is greater than a threshold, receive information that is used to disable the first sub-link and that is sent by the receive end device.

Optionally, step S800, step S810, and step S820 may be replaced by the following manner: After the receive end device determines, according to history information about the transmission delay of transmitting a data slice in the second modulation mode by using the first sub-link, the transmission delay of transmitting a data slice in the second modulation mode by using the first sub-link and determines that a difference between the transmission delay of transmitting a data slice in the second modulation mode by using the first sub-link and a transmission delay of transmitting a data slice by using the another sub-link is greater than a threshold, the receive end device sends information for disabling the first sub-link to a transmit end device, so that the transmit end device receives the information that is used to disable the first sub-link and that is sent by the receive end device.

Step S830: Disable the first sub-link and stop distributing a data slice by using the first sub-link, in the second modulation mode.

Correspondingly, the receive end device stops receiving a data slice from the first sub-link and performs data recombination on data slices received from another sub-link.

In this embodiment of the present disclosure, when channel quality of a first sub-link decreases and a modulation mode is downward adjusted, the first sub-link whose data transmission delay is relatively large may be disabled, so as to reduce recombination delay time of a data slice and reduce an impact, on a delay-difference-sensitive service, caused because a sub-link delay difference changes, so that services such as a voice service and a video service can be normally used.

Figure 13:
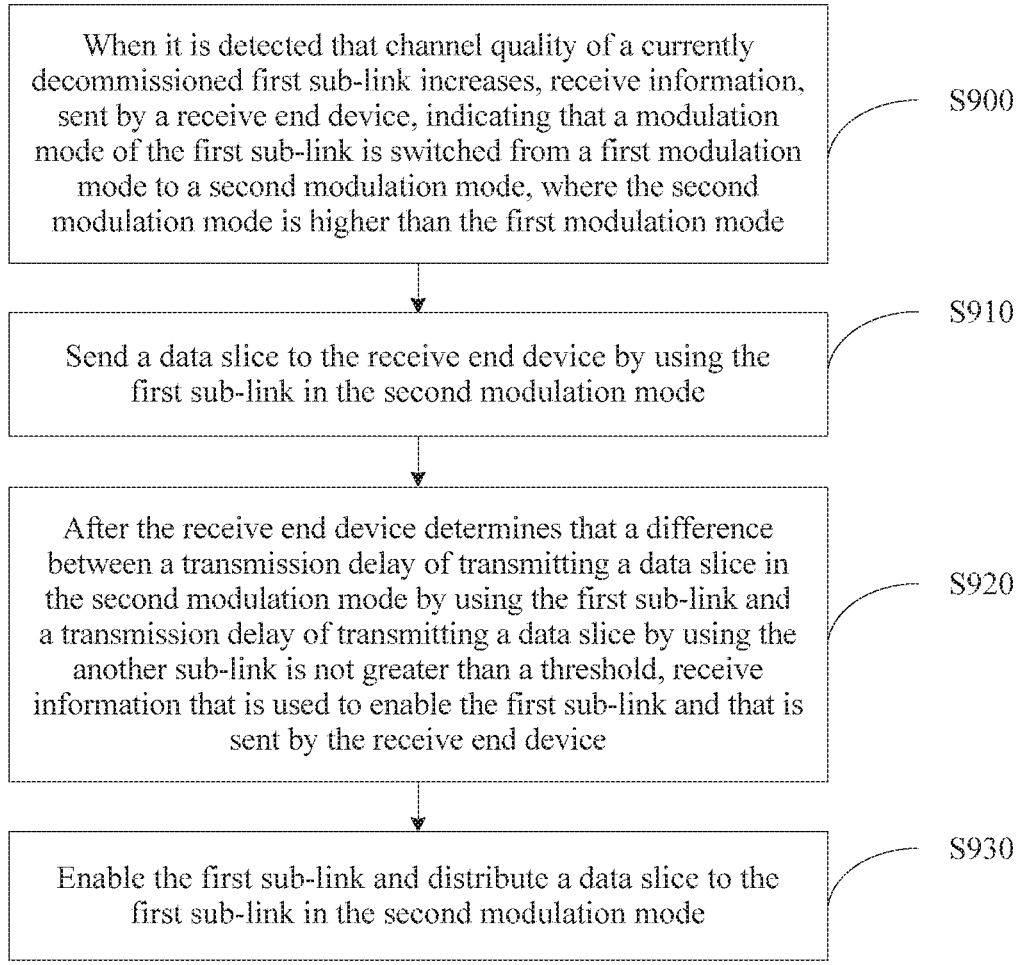
FIG. 13 is a still further flowchart of a method for adjusting a working status of an aggregated link according to an embodiment of the present disclosure.

Optionally, information that is received by a transmit end device and that is used to switch a modulation mode from a first modulation mode to a second modulation mode may be information for upward adjusting the modulation mode, and the second modulation mode is higher than the first modulation mode (a data volume that is carried in a coding manner of the second modulation mode is higher than a data volume that is carried in a coding manner of the first modulation mode). Correspondingly, a first sub-link may be a currently disabled sub-link. FIG. 13 is a still further flowchart of a method for adjusting a working status of an aggregated link according to an embodiment of the present disclosure. Referring to FIG. 13, the method may include the following steps.

Step S900: When it is detected that channel quality of a currently disabled first sub-link increases, receive information, sent by a receive end device, indicating that a modulation mode of the first sub-link is switched from a first modulation mode to a second modulation mode, where the second modulation mode is higher than the first modulation mode.

Step S910: Send a data slice to the receive end device by using the first sub-link in the second modulation mode.

Step S920: After the receive end device determines that a difference between a transmission delay of transmitting a data slice in the second modulation mode by using the first sub-link and a transmission delay of transmitting a data slice by using the another sub-link is less than or equal to a threshold, receive information that is used to enable the first sub-link and that is sent by the receive end device.

Optionally, step S900, step S910, and step S920 may be replaced by the following manner: After the receive end device determines, according to history information about the transmission delay of transmitting a data slice in the second modulation mode by using the first sub-link, the transmission delay of transmitting a data slice in the second modulation mode by using the first sub-link, and determines that a difference between the transmission delay of transmitting a data slice in the second modulation mode by using the first sub-link and a transmission delay of transmitting a data slice by using the another sub-link is less than or equal to a threshold, the receive end device sends information for enabling the disabled first sub-link to a transmit end device, so that the transmit end device receives the information that is used to enable the first sub-link and that is sent by the receive end device.

Step S930: Enable the first sub-link and distribute a data slice to the first sub-link in the second modulation mode.

Correspondingly, the receive end device receives data slices from the first sub-link and the another sub-link, and perform packet recombination on the data slices received from the first sub-link and the another sub-link.

In a method for adjusting a working status of an aggregated link provided in this embodiment of the present disclosure, when channel quality of a currently disabled sub-link increases and a modulation mode is upward adjusted, the disabled sub-link whose data transmission delay is relatively small may be enabled, so as to reduce overall transmission time of a packet, so that a network bandwidth can be fully used.

In the method for adjusting a working status of an aggregated link provided in this embodiment of the present disclosure, when a link modulation mode changes, it can be ensured that a channel has no bit error, a sub-link whose service cannot be used in the aggregated link can be discovered, and a distribution policy of data slices can be adjusted in time, so that transmission performance of delay/jitter-sensitive services such as a voice service and a video service can be ensured and hitless switch of a link can be achieved.

The following describes an apparatus for adjusting a working status of an aggregated link provided in this embodiment of the present disclosure, and the apparatus for adjusting a working status of an aggregated link described in the following and the method for adjusting a working status of an aggregated link described from the perspective of the receive end device in the above can be mutually referenced.

Figure 14:
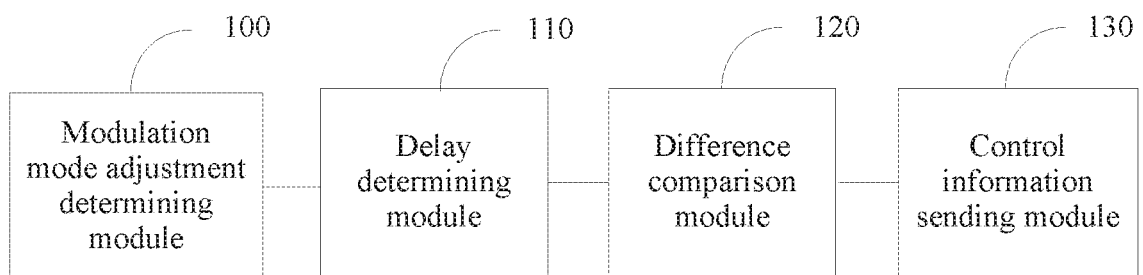
FIG. 14 is a structural block diagram of an apparatus for adjusting a working status of an aggregated link according to an embodiment of the present disclosure.

FIG. 14 is a structural block diagram of an apparatus for adjusting a working status of an aggregated link according to an embodiment of the present disclosure. The apparatus may be applied to a receive end device. Referring to FIG. 14, the apparatus may include: a modulation mode adjustment determining module 100 configured to determine to switch a modulation mode of a first sub-link of the aggregated link from a first modulation mode to a second modulation mode; a delay determining module 110 configured to: when determining to switch the modulation mode of the first sub-link of the aggregated link from the first modulation mode to the second modulation mode, determine a transmission delay of transmitting a data slice in the second modulation mode by using the first sub-link; a difference comparison module 120 configured to compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link; and a control information sending module 130 configured to: if the difference meets a preset condition, send information for controlling a working status of the first sub-link to a transmit end device, so that the transmit end device controls the working status of the first sub-link in the second modulation mode.

Figure 15:
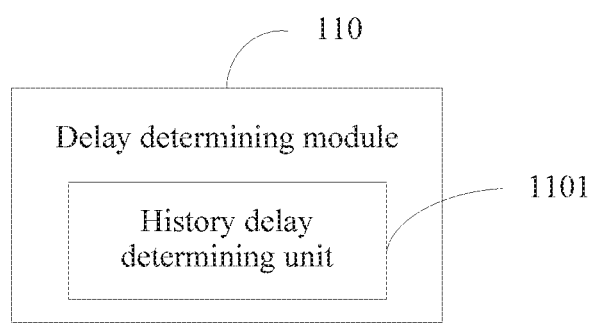
FIG. 15 is a structural block diagram of a delay determining module according to an embodiment of the present disclosure.

Optionally, FIG. 15 shows an optional structure of the delay determining module 110 provided in this embodiment of the present disclosure. Referring to FIG. 15, the delay determining module 110 may include: a history delay determining unit 1101 configured to: determine, according to pre-stored history information about a transmission delay of transmitting a data slice in the second modulation mode by using each sub-link of the aggregated link, a transmission delay of transmitting a data slice in the second modulation mode by using the first sub-link.

Figure 16:
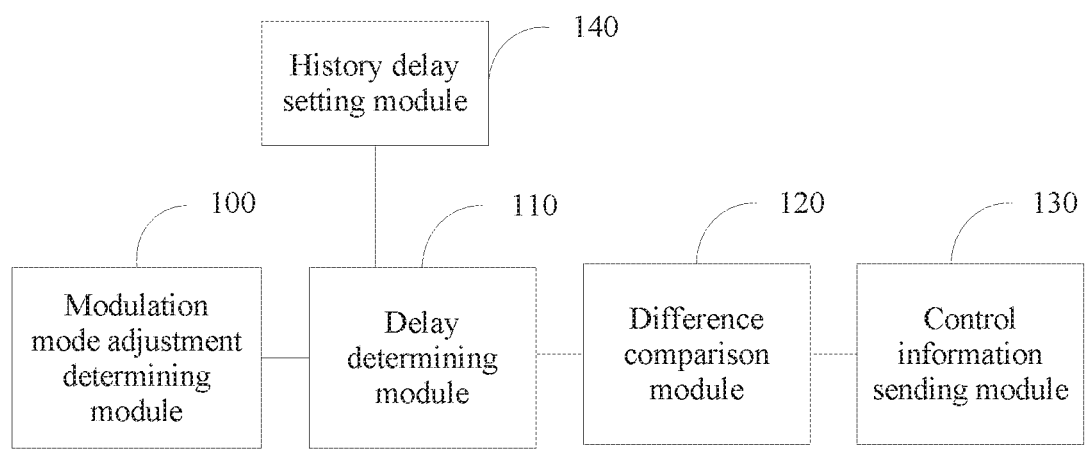
FIG. 16 is another structural block diagram of an apparatus for adjusting a working status of an aggregated link according to an embodiment of the present disclosure.

Optionally, FIG. 16 is another structural block diagram of an apparatus for adjusting a working status of an aggregated link according to an embodiment of the present disclosure. Referring to FIG. 14 and FIG. 16, the apparatus for adjusting a working status of an aggregated link may further include: a history delay setting module 140 configured to: when a modulation mode is the second modulation mode, record a receiving time stamp indicating when the data slice sent by using each sub-link is received, and determine a difference between the receiving time stamp corresponding to each sub-link and a sending time stamp carried in the data slice sent by using each sub-link as the transmission delay of transmitting the data slice by using each sub-link; and pre-store, in a database, the determined transmission delay of transmitting the data slice by using each sub-link.

Figure 17:
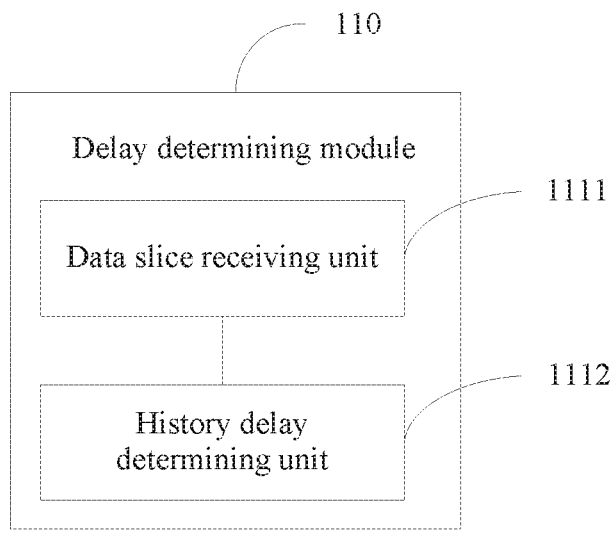
FIG. 17 is another structural block diagram of a delay determining module according to an embodiment of the present disclosure.

Optionally, FIG. 17 shows another optional structure of the delay determining module 110 provided in this embodiment of the present disclosure. Referring to FIG. 17, the delay determining module 110 may include: a data slice receiving unit 1111 configured to send information indicating that a modulation mode of a first sub-link is switched from a first modulation mode to a second modulation mode to a transmit end device, and receive a data slice that is sent by the transmit end device in the second modulation mode by using the first sub-link and that carries a sending time stamp; and a history delay determining unit 1112 configured to detect a receiving time stamp indicating when a data slice is received by using the first sub-link and determine a difference between the receiving time stamp corresponding to the first sub-link and a sending time stamp carried in the received data slice as the transmission delay of transmitting a data slice in the second modulation mode by using the first sub-link.

Figure 18:
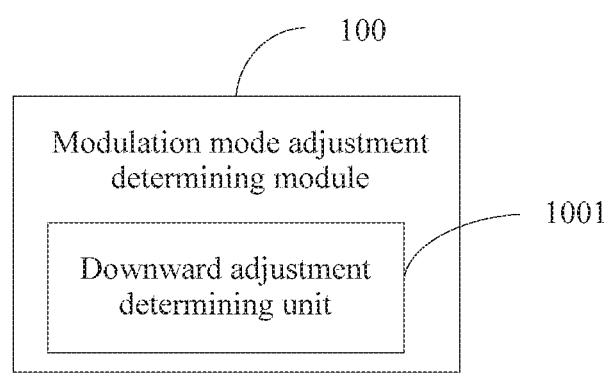
FIG. 18 is a structural block diagram of a modulation mode adjustment determining module according to an embodiment of the present disclosure.

Optionally, in this embodiment of the present disclosure, the modulation mode may be downward adjusted, and the second modulation mode is lower than the first modulation mode. Correspondingly, the first sub-link includes a currently enabled sub-link. FIG. 18 shows an optional structure of the modulation mode adjustment determining module

100. Referring to FIG. 18, the modulation mode adjustment determining module 100 may include: a downward adjustment determining unit 1001 configured to: when it is detected that channel quality corresponding to the first sub-link decreases, determine to downward adjust the modulation mode and switch the modulation mode of the first sub-link from the first modulation mode to the second modulation mode, where a data volume carried in a coding manner of the second modulation mode is lower than a data volume carried in a coding manner of the first modulation mode.

Figure 19:
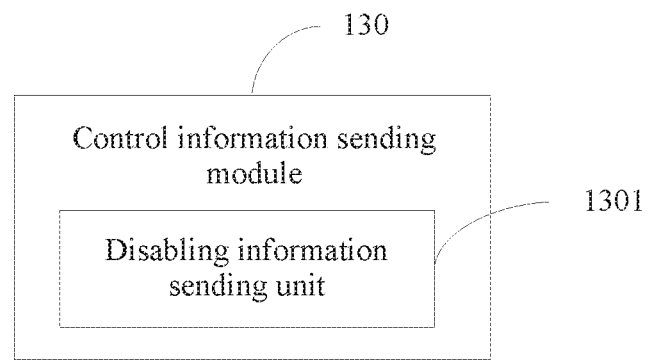
FIG. 19 is a structural block diagram of a control information sending module according to an embodiment of the present disclosure.

Correspondingly, FIG. 19 shows an optional structure of the control information sending module 130. Referring to FIG. 19, the control information sending module 130 may include: a disabling information sending unit 1301 configured to: when a difference between a transmission delay of transmitting a data slice in a second modulation mode by using a first sub-link and a transmission delay of transmitting a data slice by using another sub-link is greater than a threshold, send information for disabling the first sub-link to a transmit end device, so that the transmit end device stops sending a data slice by using the first sub-link.

Correspondingly, the apparatus for adjusting a working status of an aggregated link may further include: a first recombination module configured to be used by the receive end device to receive data slices from the another sub-link after the transmit end device stops sending a data slice by using the first sub-link, and perform data recombination on the data slices received from the another sub-link.

Figure 20:
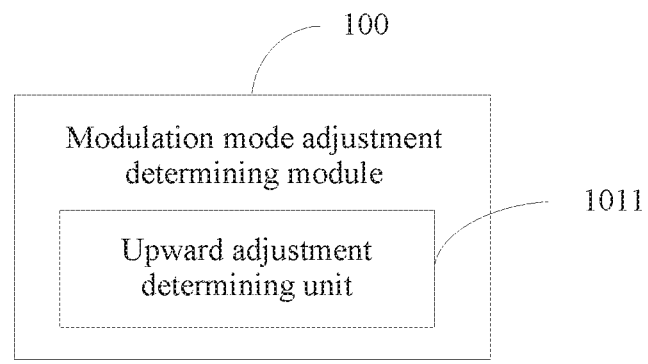
FIG. 20 is another structural block diagram of a modulation mode adjustment determining module according to an embodiment of the present disclosure.

Optionally, in this embodiment of the present disclosure, the modulation mode may be upward adjusted and the second modulation mode is higher than the first modulation mode. Correspondingly, the first sub-link includes a currently disabled sub-link. FIG. 20 shows another optional structure of the modulation mode adjustment determining module 100. Referring to FIG. 20, the modulation mode adjustment determining module 100 may include: an upward adjustment determining unit 1011 configured to: when it is detected that channel quality corresponding to the first sub-link increases, determine to upward adjust a modulation mode of the first sub-link disabled in the first modulation mode and switch the modulation mode of the first sub-link from the first modulation mode to the second modulation mode, where a data volume carried in a coding manner of the second modulation mode is higher than a data volume carried in a coding manner of the first modulation mode.

Figure 21:
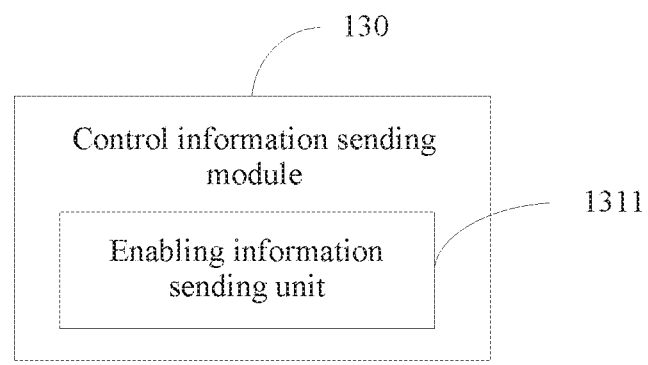
FIG. 21 is another structural block diagram of a control information sending module according to an embodiment of the present disclosure.

Correspondingly, FIG. 21 shows another optional structure of the control information sending module 130. Referring to FIG. 21, the control information sending module 130 may include: an enabling information sending unit 1311 configured to: when a difference between a transmission delay of transmitting a data slice in the second modulation mode by using the first sub-link and a transmission delay of transmitting a data slice by using the another sub-link is less than or equal to the threshold, send information for enabling the first sub-link to the transmit end device, so that the transmit end device sends a data slice by using the first sub-link.

Correspondingly, the apparatus for adjusting a working status of an aggregated link may further include: a second recombination module configured to be used by the receive end device to receive data slices from the another sub-link and the first sub-link after the transmit end device sends a data slice by using the first sub-link, and perform data recombination on the data slices received from the another sub-link and the first sub-link.

This embodiment of the present disclosure further provides a terminal device. The terminal device may include the foregoing apparatus for adjusting a working status of an aggregated link.

Figure 22:
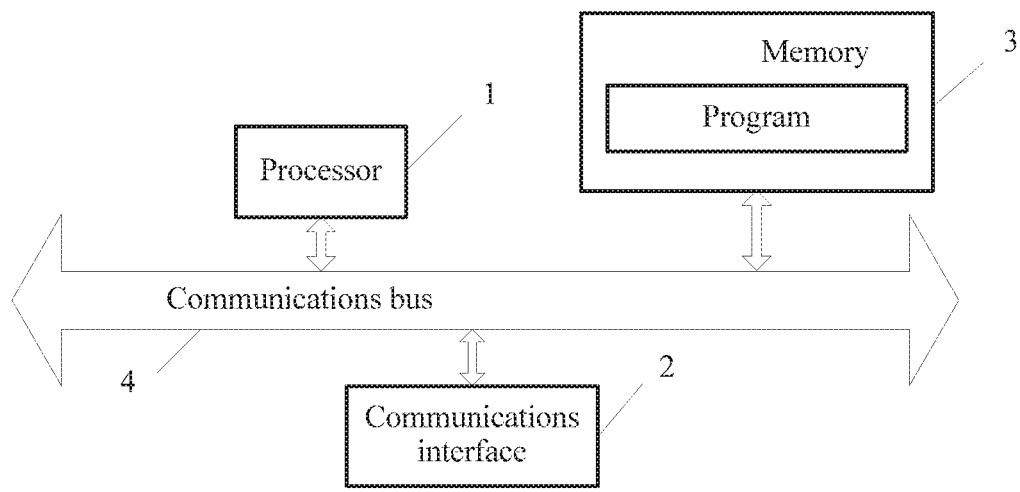
FIG. 22 is a hardware structural block diagram of a terminal device according to an embodiment of the present disclosure.

FIG. 22 shows a hardware structural block diagram of a terminal device. Referring to FIG. 22, the terminal device may include: a processor 1, a communications interface 2, a memory 3, and a communications bus 4.

The processor 1, the communications interface 2, and the memory 3 complete mutual communication by using the communications bus 4.

Optionally, the communications interface 2 may be an interface of a communication module, for example, an interface of a global system for mobile communication (GSM) module.

The processor 1 is configured to perform a program.

The memory 3 is configured to store a program.

The program may include program code and the program code includes a computer operation instruction.

The processor 1 may be a central processing unit (CPU), or an application-specific integrated circuit (ASIC), or one or more integrated circuits configured to implement this embodiment of the present disclosure.

The memory 3 may include a high-speed random access memory (RAM), and may further include a nonvolatile memory, for example, at least one magnetic disk memory.

The program may be used to: when it is determined that a modulation mode of a first sub-link of an aggregated link is switched from a first modulation mode to a second modulation mode, determine a transmission delay of transmitting a data slice in the second modulation mode by using the first sub-link; compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link; and if the difference meets a preset condition, send information for controlling a working status of the first sub-link to a transmit end device, so that the transmit end device controls the working status of the first sub-link in the second modulation mode.

From a perspective of a transmit end device, the following describes an apparatus for adjusting a working status of an aggregated link provided in this embodiment of the present disclosure, and the apparatus for adjusting a working status of an aggregated link described in the following and the method for adjusting a working status of an aggregated link described from the perspective of the transmit end device in the above can be mutually referenced.

Figure 23:
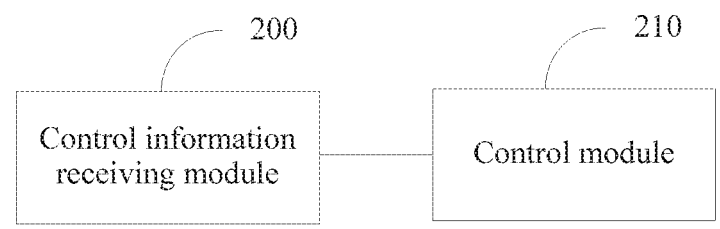
FIG. 23 is still another structural block diagram of an apparatus for adjusting a working status of an aggregated link according to an embodiment of the present disclosure.

FIG. 23 is still another structural block diagram of an apparatus for adjusting a working status of an aggregated link according to an embodiment of the present disclosure. The apparatus is applied to a transmit end device. Referring to FIG. 23, the apparatus may include: a control information receiving module 200 configured to: when a receive end device determines to switch a modulation mode of a first sub-link of an aggregated link from a first modulation mode to a second modulation mode, and determines that a difference between a transmission delay of transmitting a data slice in the second modulation mode by using the first sub-link and a transmission delay of transmitting a data slice by using another sub-link of the aggregated link meets a preset condition, receive information that is for controlling a working status of the first sub-link and that is sent by the receive end device, where the another sub-link includes a sub-link that is currently in an enabled state in the aggregated link; and a control module 210 configured to control the working status of the first sub-link in the second modulation mode.

Figure 24:
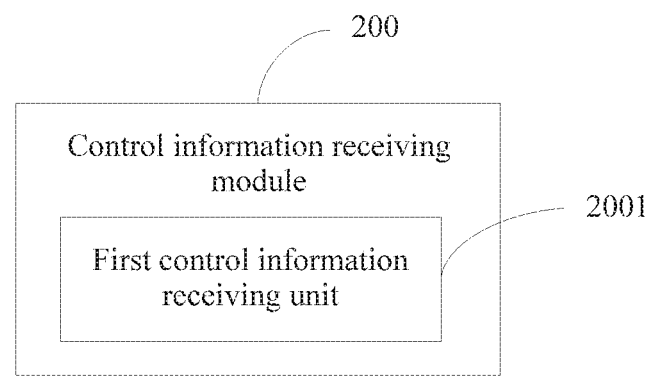
FIG. 24 is a structural block diagram of a control information receiving module according to an embodiment of the present disclosure.

Optionally, FIG. 24 shows an optional structure of the control information receiving module 200 provided in this embodiment of the present disclosure. Referring to FIG. 24, the control information receiving module 200 may include: a first control information receiving unit 2001 configured to: after the receive end device determines, according to pre-stored history information about a transmission delay of transmitting a data slice in the second modulation mode by using each sub-link of the aggregated link, the transmission delay of transmitting a data slice in the second modulation mode by using the first sub-link, and determines that the difference between the transmission delay of transmitting a data slice in the second modulation mode by using the first sub-link and the transmission delay of transmitting a data slice by using the another sub-link of the aggregated link meets the preset condition, receive information that is for controlling the working status of the first sub-link and that is sent by the receive end device.

Figure 25:
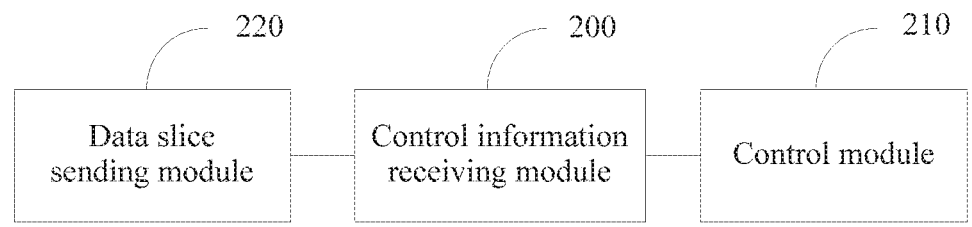
FIG. 25 is yet another structural block diagram of an apparatus for adjusting a working status of an aggregated link according to an embodiment of the present disclosure.

Optionally, FIG. 25 is yet another structural block diagram of an apparatus for adjusting a working status of an aggregated link according to an embodiment of the present disclosure. Referring to FIG. 23 and FIG. 25, the apparatus for adjusting a working status of an aggregated link may further include: a data slice sending module 220 configured to: after information, sent by the receive end device, indicating that the modulation mode of the first sub-link is switched from the first modulation mode to the second modulation mode is received, send a data slice to the receive end device in the second modulation mode by using the first sub-link, so that the receive end device determines a difference between a receiving time stamp indicating when a data slice is received by using the first sub-link and a sending time stamp carried in the received data slice as the transmission delay of transmitting a data slice in the second modulation mode by using the first sub-link.

Figure 26:
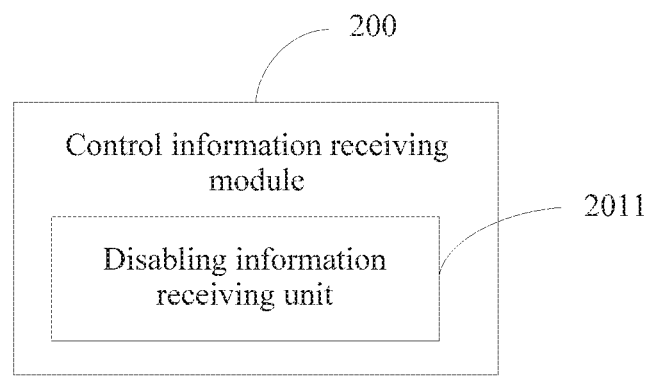
FIG. 26 is another structural block diagram of a control information receiving module according to an embodiment of the present disclosure.

Optionally, in this embodiment of the present disclosure, the modulation mode may be downward adjusted, and the second modulation mode is lower than the first modulation mode. Correspondingly, the first sub-link includes a currently enabled sub-link. Correspondingly, FIG. 26 shows another optional structure of the control information receiving module 200. Referring to FIG. 26, the control information receiving module 200 may include: a disabling information receiving unit 2011 configured to: after the receive end device determines that the difference between the transmission delay of transmitting a data slice in the second modulation mode by using the first sub-link and the transmission delay of transmitting a data slice by using the another sub-link is greater than a threshold, receive information that is used to disable the first sub-link and that is sent by the receive end device.

Figure 27:
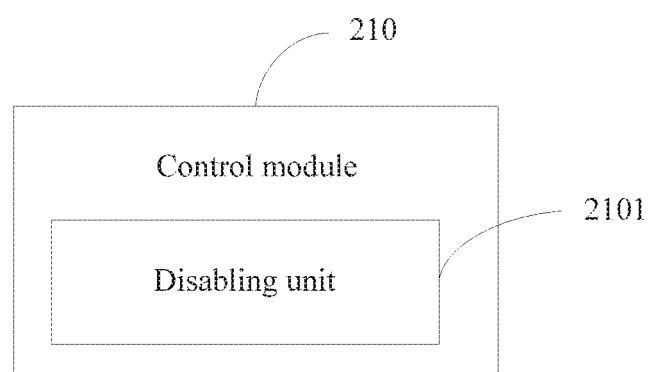
FIG. 27 is a structural block diagram of a control module according to an embodiment of the present disclosure.

Correspondingly, FIG. 27 shows an optional structure of the control module 210. Referring to FIG. 27, the control module 210 may include: a disabling unit 2101 configured to disable the first sub-link in the second modulation mode.

Figure 28:
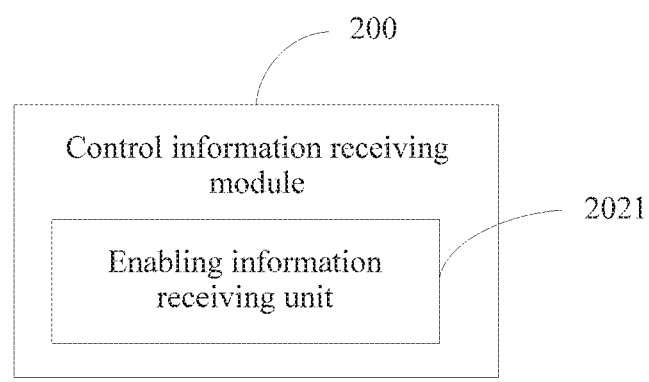
FIG. 28 is still another structural block diagram of a control information receiving module according to an embodiment of the present disclosure.

Optionally, in this embodiment of the present disclosure, the modulation mode may be upward adjusted and the second modulation mode is higher than the first modulation mode. Correspondingly, the first sub-link includes a currently disabled sub-link. Correspondingly, FIG. 28 shows still another optional structure of a control information receiving module 200. Referring to FIG. 28, the control information receiving module 200 may include: an enabling information receiving unit 2021 configured to: after the receive end device determines that the difference between the transmission delay of transmitting a data slice in the second modulation mode by using the first sub-link and the transmission delay of transmitting a data slice by using the another sub-link is less than or equal to a threshold, receive information that is used to enable the first sub-link and that is sent by the receive end device.

Figure 29:
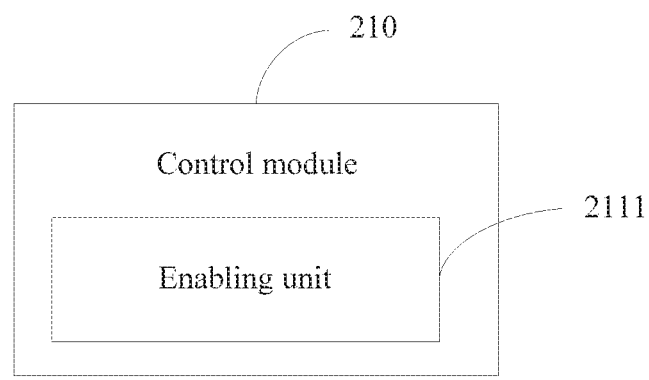
FIG. 29 is another structural block diagram of a control module according to an embodiment of the present disclosure.

Correspondingly, FIG. 29 shows another optional structure of the control module 210. Referring to FIG. 29, the control module 210 may include: an enabling unit 2111 configured to enable the first sub-link in the second modulation mode.

This embodiment of the present disclosure further provides a terminal device. The terminal device may include the foregoing apparatus for adjusting a working status of an aggregated link described as the transmit end device.

Figure 30:
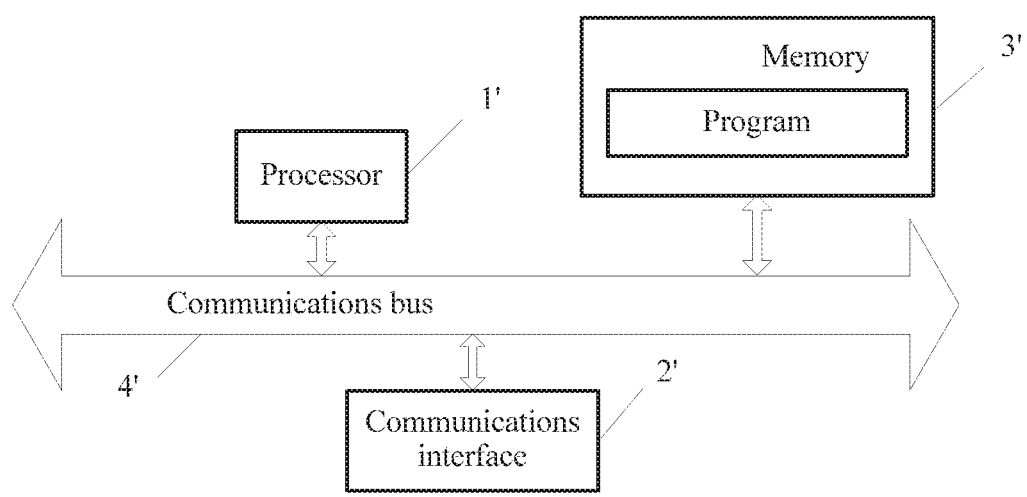
FIG. 30 is another hardware structural block diagram of a terminal device according to an embodiment of the present disclosure.

FIG. 30 shows another hardware structural block diagram of a terminal device. Referring to FIG. 30, the terminal device may include: a processor 1', a communications interface 2', a memory 3', and a communications bus 4'.

The processor 1', the communications interface 2', and the memory 3' complete mutual communication by using the communications bus 4'.

Optionally, the communications interface 2' may be an interface of a communication module, for example, an interface of a GSM module.

The processor 1' is configured to perform a program.

The memory 3' is configured to store a program.

The program may include program code and the program code includes a computer operation instruction.

The processor 1' may be a CPU, or an ASIC, or one or more integrated circuits configured to implement this embodiment of the present disclosure.

The memory 3' may include a high-speed RAM memory, and may further include a nonvolatile memory, for example, at least one magnetic disk memory.

The program may be used to: when a receive end device determines to switch a modulation mode of a first sub-link of an aggregated link from a first modulation mode to a second modulation mode, and determines that a difference between a transmission delay of transmitting a data slice in the second modulation mode by using the first sub-link and a transmission delay of transmitting a data slice by using another sub-link of the aggregated link meets a preset condition, receive information that is for controlling a working status of the first sub-link and that is sent by the receive end device, where the another sub-link includes a sub-link that is currently in an enabled state in the aggregated link; and control the working status of the first sub-link in the second modulation mode.

It should be noted that the method for adjusting a working status of an aggregated link described from the perspective of the receive end device in this embodiment of the present disclosure and the method for adjusting a working status of an aggregated link described from the perspective of the transmit end device may be applied to a same terminal device. The receive end device may be considered as a terminal device in a data receiving status and the transmit end device may be considered as a terminal device in a data sending status. Obviously, a terminal device may be in the data sending status at a stage or in the data receiving status at another stage. The data receiving status of the terminal device may be applied to the method for adjusting a working status of an aggregated link described from the perspective of the receive end device and the data sending status of the terminal device may be applied to the method for adjusting a working status of an aggregated link described from the perspective of the transmit end device.

For a structure of a system for adjusting a working status of an aggregated link provided in this embodiment of the present disclosure, reference may be made to FIG. 1. The system includes a receive end device 1 and a transmit end device 2; where the receive end device 1 is configured to: when determining to switch a modulation mode of a first sub-link of an aggregated link from a first modulation mode to a second modulation mode, determine a transmission delay of transmitting a data slice in the second modulation mode by using the first sub-link; compare the transmission delay of transmitting a data slice in the second modulation mode by using the first sub-link with a transmission delay of transmitting a data slice by using another sub-link of the aggregated link, to obtain a difference, where the another sub-link includes a sub-link that is currently in an enabled state in the aggregated link; and if the difference meets a preset condition, send information for controlling a working status of the first sub-link to the transmit end device, and the transmit end device 2 is configured to receive the information that is for controlling the working status of the first sub-link and that is sent by the receive end device, and control the working status of the first sub-link in the second modulation mode.

In the present disclosure, when a link modulation mode changes, it can be ensured that a channel has no bit error, a sub-link whose service cannot be used in an aggregated link can be discovered, and a distribution policy of data slices can be adjusted in time, so that transmission performance of delay/jitter-sensitive services such as a voice service and a video service can be ensured and hitless switch of a link can be achieved.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In combination with the embodiments disclosed in this specification, method or algorithm steps may be implemented by hardware, a software module executed by a processor, or a combination thereof. The software module may reside in RAM, a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. An apparatus for adjusting a working status of an aggregated link, wherein the apparatus comprises:
   a processor configured to:
   determine to switch a modulation mode of a first sub-link of the aggregated link from a first modulation mode to a second modulation mode;
   determine a first transmission delay of transmitting a first data slice in the second modulation mode using the first sub-link; and
   compare the first transmission delay with a second transmission delay of transmitting a second data slice using another sub-link of the aggregated link, wherein the other sub-link comprises a sub-link currently in an enabled state in the aggregated link; and
   a transmitter coupled to the processor, the transmitter configured to send information for controlling a working status of the first sub-link to a transmit end device when a difference between the first transmission delay and the second transmission delay meets a preset condition, wherein the information comprises one of a disable instruction, an enable instruction, or a modulation change instruction.

2. The apparatus of claim 1, wherein the processor is further configured to:
   determine the first transmission delay based, at least in part, on pre-stored history information of a plurality of transmission delays of transmitting in the second modulation mode using each sub-link of the aggregated link;
   record receiving time stamps corresponding to when each data slice is received on each sub-link when a modulation mode is the second modulation mode;
   determine a difference between the receiving time stamp corresponding to each sub-link and a sending time stamp carried in the data slice sent using each sub-link as the transmission delay of transmitting the data slice using each sub-link; and
   store the difference for each sub-link in a database.

3. The apparatus of claim 1, wherein the transmitter is further configured to:
   send information indicating that the modulation mode of the first sub-link is switched from the first modulation mode to the second modulation mode to the transmit end device; and
   receive a data slice comprising a sending time stamp from the transmit end device in the second modulation mode using the first sub-link, and
   wherein the processor is further configured to:
   detect a receiving time stamp indicating when a data slice is received; and
   determine a difference between the receiving time stamp and the sending time as the transmission delay of transmitting in the second modulation mode using the first sub-link.

4. The apparatus of claim 1, wherein the first sub-link comprises an enabled sub-link, wherein the processor is further configured to determine to downward adjust the modulation mode and switch the modulation mode of the first sub-link from the first modulation mode to the second modulation mode when channel quality corresponding to the first sub-link decreases, and wherein a second data volume carried in a second coding manner of the second modulation mode is lower than a first data volume carried in a first coding manner of the first modulation mode.

5. The apparatus of claim 4, wherein the transmitter is further configured to send information for disabling the first sub-link to the transmit end device when the difference between the first transmission delay and the transmission delay of transmitting using the other sub-link is greater than a threshold, wherein the apparatus further comprises: a receiver configured to receive data slices from the other sub-link after the transmit end device stops sending using the first sub-link, and wherein the processor is further configured to perform data recombination on the data slices received from the other sub-link.

6. The apparatus of claim 1, wherein the first sub-link comprises a disabled sub-link, wherein the processor is further configured to determine to upward adjust a modulation mode of the first sub-link disabled in the first modulation mode and switch the modulation mode of the first sub-link from the first modulation mode to the second modulation mode when channel quality corresponding to the first sub-link increases, wherein a second data volume carried in a second coding manner of the second modulation mode is higher than a first data volume carried in a first coding manner of the first modulation mode.

7. The apparatus of claim 6, wherein the transmitter is further configured to send information for enabling the first sub-link to the transmit end device when the difference between the first transmission delay and the transmission delay of transmitting using the other sub-link is less than or equal to a threshold, wherein the apparatus further comprises a receiver configured to receive data slices from the other sub-link and the first sub-link, and wherein the processor is further configured to perform data recombination on the data slices received from the other sub-link and the first sub-link.

8. An apparatus for adjusting a working status of an aggregated link, wherein the apparatus comprises:
a receiver configured to receive information for controlling a working status of a first sub-link of the aggregated link from a receive end device, wherein the information comprises one of a disable instruction, an enable instruction, or a modulation change instruction;
a processor coupled to the receiver, wherein the processor is configured to control the working status of the first sub-link in a second modulation mode based on the information; and
a transmitter coupled to the processor and configured to transmit a first data slice via the first sub-link and a second data slice via a second sub-link of the aggregated link, wherein the receiver is configured to receive the information from the receive end device when a difference between a first transmission delay of transmitting the first data slice and a second transmission delay of transmitting the second data slice meets a preset condition.

9. The apparatus of claim 8, wherein the processor is further configured to determine the first transmission delay based, at least in part, on pre-stored history information of a plurality of transmission delays of transmitting in the second modulation mode using each sub-link of the aggregated link.

10. The apparatus of claim 8, wherein the transmitter is further configured to send a data slice comprising a sending time stamp to the receive end device in the second modulation mode using the first sub-link, and wherein the second sub-link comprises a sub-link currently in an enabled state in the aggregated link.

11. The apparatus of claim 8, wherein the first sub-link comprises an enabled sub-link and the second sub-link comprises a disabled sub-link, wherein the information is used to disable the first sub-link from and enable the second sub-link, and wherein the processor is further configured to disable the first sub-link in the second modulation mode and enable the second-data link in a first modulation mode.

12. The apparatus of claim 8, wherein the first sub-link comprises a disabled sub-link and the second sub-link comprises an enabled sub-link, wherein the information is used to enable the first sub-link and disable the second sub-link, and wherein the processor is further configured to enable the first sub-link in the second modulation mode and disable the second-data link in a first modulation mode.

13. A method for adjusting a working status of an aggregated link, wherein the method comprises:
determining a transmission delay of transmitting a data slice in a second modulation mode using a first sub-link;
comparing a first transmission delay of transmitting a first data slice in the second modulation mode using the first sub-link with a second transmission delay of transmitting a second data slice using another sub-link of the aggregated link, wherein the other sub-link comprises a sub-link currently in an enabled state in the aggregated link; and
sending information for controlling a working status of the first sub-link to a transmit end device when a difference between the first transmission delay and the second transmission delay meets a preset condition, wherein the information comprises one of a disable instruction, an enable instruction, or a modulation change instruction.

14. The method of claim 13, wherein determining the transmission delay comprises determining the first transmission delay based, at least in part, on pre-stored history information of a plurality of transmission delays of transmitting in the second modulation mode using each sub-link of the aggregated link.

15. The method of claim 14, wherein pre-storing the history information comprises:
recording receiving time stamps corresponding to when each data slice is received on each sub-link;
determining a difference between the receiving time stamp corresponding to each sub-link and a sending time stamp in the data slice sent using each sub-link as the transmission delay of transmitting the data slice using each sub-link; and
storing the difference for each sub-link in a database.

16. The method of claim 13, wherein the first sub-link comprises an enabled sub-link, and wherein the method further comprises:
determining to downward adjust a first modulation mode and determining to switch the first modulation mode of the first sub-link from the first modulation mode to the second modulation mode when channel quality corresponding to the first sub-link decreases, wherein a first data volume carried in a second coding manner of the second modulation mode is lower than a first data volume carried in a first coding manner of the first modulation mode, wherein the preset condition comprises the difference is greater than a threshold, wherein the information comprises information for disabling the first sub-link to the transmit end device;

receiving, by a receive end device, data slices from the other sub-link; and performing data recombination on the data slices received from the other sub-link.

17. The method of claim 13, wherein the first sub-link comprises a disabled sub-link, and wherein the method further comprises:

determining to upward adjust a first modulation mode of the first sub-link and determining to switch the first modulation mode of the first sub-link from the first modulation mode to the second modulation mode when channel quality corresponding to the first sub-link increases, wherein a second data volume carried in a second coding manner of the second modulation mode is higher than a first data volume carried in a first coding manner of the first modulation mode, wherein the preset condition comprises the difference is less than or equal to a threshold, wherein the information comprises information for enabling the first sub-link to the transmit end device;

receiving, by a receive end device, data slices from the other sub-link and the first sub-link; and performing data recombination on the data slices received from the other sub-link and the first sub-link.

18. A method for adjusting a working status of an aggregated link, wherein the method comprises:

receiving information that is for controlling a working status of a first sub-link of the aggregated link from a receive end device, wherein the information comprises one of a disable instruction, an enable instruction, or a modulation change instruction;

controlling the working status of the first sub-link in a second modulation mode based on the information; and transmitting a first data slice via the first sub-link and a second data slice via a second sub-link of the aggregated link, wherein the information from the receive end device is received when a difference between a first transmission delay of transmitting the first data slice and a second transmission delay of transmitting the second data slice meets a preset condition.

19. The method of claim 18, wherein the first sub-link comprises an enabled sub-link and the second sub-link comprises a disabled link, wherein the information is used to disable the first sub-link and enable the second sub-link, and wherein controlling the working status comprises disabling the first sub-link in the second modulation mode and enabling the second sub-link in a first modulation mode.

20. The method of claim 18, wherein the first sub-link comprises a disabled sub-link and the second sub-link comprises an enabled link, wherein the information is used to enable the first sub-link and disable the second sub-link, and wherein controlling the working status comprises enabling the first sub-link in the second modulation mode and disabling the second sub-link in a first modulation mode.

* * * * *